United States Patent
Chikusa et al.

(10) Patent No.: US 7,917,551 B2
(45) Date of Patent: Mar. 29, 2011

(54) STORAGE SYSTEM AND MANAGEMENT METHOD THEREOF

(75) Inventors: Takashi Chikusa, Odawara (JP); Satoru Yamaura, Odawara (JP); Kenichi Saitou, Tokyo (JP); Hiroyuki Kumasawa, Odawara (JP); Masanobu Uryuu, Nakai (JP)

(73) Assignee: Hitachi, Ltd., Tokyo (JP)

( * ) Notice: Subject to any disclaimer, the term of this patent is extended or adjusted under 35 U.S.C. 154(b) by 706 days.

(21) Appl. No.: 12/007,328

(22) Filed: Jan. 9, 2008

(65) Prior Publication Data

US 2008/0208927 A1 Aug. 28, 2008

(30) Foreign Application Priority Data

Feb. 23, 2007 (JP) ................................ 2007-044654

(51) Int. Cl.
*G06F 12/00* (2006.01)
(52) U.S. Cl. .......................... 707/821; 711/114; 709/213
(58) Field of Classification Search ........................ None
See application file for complete search history.

(56) References Cited

U.S. PATENT DOCUMENTS

2008/0010295 A1 * 1/2008 Park et al. ........................ 707/10

FOREIGN PATENT DOCUMENTS

| JP | 2006-514377 | 5/2003 |
|---|---|---|
| JP | 2006-521592 | 5/2003 |
| JP | 2006-521594 | 5/2003 |
| WO | WO 2004/097680 A1 | 11/2004 |
| WO | WO 2004/097681 A1 | 11/2004 |
| WO | WO 2004/097682 A1 | 11/2004 |

* cited by examiner

*Primary Examiner* — Charles Rones
*Assistant Examiner* — Belix M Ortiz
(74) *Attorney, Agent, or Firm* — Foley & Lardner LLP

(57) ABSTRACT

One or more storage controllers include a folder configuration unit for configuring a plurality of folders to store the plurality of contents in the plurality of logical volumes, a core-contents management unit for specifying and managing core-contents to become the core from the plurality of contents to be stored in the plurality of logical volumes or the plurality of folders, a related contents management unit for managing the core-contents and one or more related contents associated with a part or the whole of the core-contents from a plurality of contents to be stored in the plurality of logical volumes or the plurality of folders, and a group folder configuration unit for configuring a group folder that groups the core-contents and the related contents across the plurality of logical volumes or the plurality of folders.

8 Claims, 34 Drawing Sheets

FIG.3

| 710A | 710B | 710C | 710D | 710E | 710F | 710G | 710H | 710I | 710J |
|---|---|---|---|---|---|---|---|---|---|
| VOLUME ID | PATH NAME | FILE NAME | DATA LENGTH | ATTRIBUTE INFORMATION | PHYSICAL APPARATUS ID | LUN | TOP LBA | USED DATA LENGTH | LINK TABLE |
| nas_01 | ¥xxx | aaa.doc | 512000 | NORMAL | 20 | 0 | 00100000h | 512000 | -1 (NULL) |
| nas_01 | ¥yyy | bbb.pdf | 2048000 | NORMAL | 20 | 0 | 01000000h | 2048000 | -1 (NULL) |
| nas_01 | ¥zzz | ccc.html | 32100 | NORMAL | 20 | 1 | 00000000h | 20480 | 20 |
| .. | .. | .. | .. | .. | .. | .. | .. | .. | .. |
| nas_01 | ¥Special dir | File_A.doc | 409600 | EXPANDED | 20 | 0 | 00000000h | 409600 | -1 (NULL) |
| .. | .. | .. | .. | .. | .. | .. | .. | .. | .. |

| FUNCTIONAL FOLDER NAME | FUNCTION NAME | USAGE | REQUEST EXECUTABILITY |
|---|---|---|---|
| /imp | IMPORT | READING PORTABILITY/SNAPSHOT FILE | ◯ |
| /exp | EXPORT | CREATING PORTABILITY FILE | ◯ |
| /snap | SNAPSHOT | CREATING SNAPSHOT FILE | ◯ |

FIG.18

| REQUEST FUNCTION NAME | DESCRIPTION | OPERATION |
|---|---|---|
| SUBJECT FILE DEFINITION | CREATION OF ENTRY IN METADATA | COPY TO SPECIFIED FOLDER, CREATION OF NEW FILE |
| ASSOCIATION/ DISASSOCIATION | ADDITION/DELETION OF NODE INFORMATION TO AND FROM METADATA | DROP TO/DELETION OF VIRTUAL FOLDER |
| METADATA CONTROL | CHANGE OF REAL FILE RELATIONSHIP/CREATION OF VIRTUAL OBJECT FILE/CHANGE OF ATTRIBUTE INFORMATION | CHANGE OF NAME/ATTRIBUTE OF FILE IN VIRTUAL FOLDER |
| SNAPSHOT EXECUTION | CREATION OF SNAPSHOT AND ADDITION OF META ENTRY | DROP OF VIRTUAL FOLDER TO/SNAP FOLDER |
| VIRTUAL FOLDER CONTROL | OPENING AND CLOSING OF VIRTUAL FOLDER/CHANGE OF ATTRIBUTE INFORMATION | DOUBLE CLICK/NAME CHANGE OF VIRTUAL FOLDER |
| REAL NODE LIST REPORT | SIMULTANEOUS EXECUTE OF PLURALITY OF RELEVANT FILES/REFERENCE TO FOLDER | - |
| IMPORT/EXPORT | READING/CREATION OF PORTABILITY FILE | DROP OF VIRTUAL FOLDER TO /imp./exp FOLDER |
| SECURITY SETTING | SETTING OF PORTABILITY EXPIRATION DATE AND IMPORT PASSWORD | CREATION OF SECURITY FILE IN VIRTUAL FOLDER |

STORAGE SYSTEM AND MANAGEMENT METHOD THEREOF

CROSS REFERENCES

This application relates to and claims priority from Japanese Patent Application No. 2007-044654, filed on Feb. 23, 2007, the entire disclosure of which is incorporated herein by reference.

BACKGROUND

The present invention generally relates to a storage system and its management method, and in particular can be suitably applied to a storage system requiring the management of a plurality of files.

In recent years, numerous storage products for archiving contents (files or file groups) in the storage sector have been released.

Contents are managed using a path name (location information) configured from a logical volume (hereinafter referred to as a "volume") provided from a storage area of a physical device, and the name of a folder or a file. In addition, contents are usually managed according to the combination of type management based on the file type or file/folder attribute, and time management based on time stamp information and the like.

Generally speaking, as a method of grouping and managing these contents, there is a method of grouping and managing such contents in volume basis or folder basis. Further, as a different management method, there is a method of performing hashing operation to the main matter (data) of the contents and managing such contents on a file basis based on the comparison of the operation results, and the contents can also be managed based on the combination of file type management and time management described above.

Incidentally, these management methods are a type of filtering technology, and factors (e.g. type or time) that are compared to and coincide with the match criteria set with certain factors are used in type management and time management. The collective designation of the combination of these conditions is known as a "policy."

As methods for managing the contents according to the foregoing conventional systems, there are a management method in file basis, a management method on a folder basis, a management method in volume basis, and a management method combining the policies for performing filtering based on these file attributes and the like.

Further, as a method of grouping the foregoing contents and displaying the same to users in an easy-to-provide manner, there are the technologies disclosed in PC (WO) 2006-514377, PC (WO) 2006-521592 and PC (WO) 2006-521594. These patent documents disclose a method of grouping a plurality of contents across folders or volumes.

SUMMARY

The methods disclosed in these patent documents do not perform grouping by associating the contents, and merely filter a plurality of contents based on the foregoing policy conditions (for instance, type of file based on file extension) or the like, and consequently refer to the extracted contents cluster (files) as a group.

Meanwhile, under the storage system environment, the grouping and management of contents have an aspect deemed to be a problem regarding the usability by users. Moreover, management of the file attributes and the like required for the foregoing grouping is mainly managed from the OS (operating system) side. Thus, on the storage controller (storage) side, since it is only possible to manage the contents on a folder basis or volume basis as described above excluding information among the foregoing attribute information filtered for the management of the update difference based on the file update time or the like, it was difficult to group the contents that are related across folders or volumes.

In particular, when grouping and managing the contents on a folder basis, in order to use the same information between different business units, it is necessary to (1) store the same information in the common folder managed by the respective business units, or (2) make the respective business units create a new common folder and arrange a shortcut to the contents managed by the opponent's unit in such common folder. Thus, in the storage system, it is necessary to manage the newly created common folder and set the access authority for accessing the common folder, and there is a problem in that the administrator or operator will be burdened with an additional task.

The present invention was made in view of the foregoing points. Thus, an object of the present invention is to provide a storage system and its management method enabling the referral of contents from any host system, and capable of reducing the vexatious complication of administrators and operators concerning management and setting of access authority.

In order to achieve the foregoing object, the present invention provides a storage system comprising one or more storage controllers for forming a plurality of logical volumes in a storage area of a physical device for storing a plurality of contents provided from a host system. The one or more storage controllers comprise a folder configuration unit for configuring a plurality of folders to store the plurality of contents in the plurality of logical volumes, a core-contents management unit for specifying and managing core-contents to become the core (main content) from the plurality of contents to be stored in the plurality of logical volumes or the plurality of folders, a relevant-contents management unit for managing the core-contents and one or more relevant-contents associated with a part or the whole of the core-contents from a plurality of contents to be stored in the plurality of logical volumes or the plurality of folders, and a group folder configuration unit for configuring a group folder that groups the core-contents and the related contents across the plurality of logical volumes or the plurality of folders.

Thereby, it is possible to associate a plurality of contents stored in individual volumes or individual folders and group such plurality of contents across a plurality of logical volumes or a plurality of folders.

The present invention further provides a management method of a storage system comprising one or more storage controllers for creating a plurality of logical volumes in a storage area of a physical device for storing a plurality of contents provided from a host system. The one or more storage controllers perform a folder creation step for creating a plurality of folders to store the plurality of contents in the plurality of logical volumes, a core-contents management step for specifying and managing core-contents to become the core from the plurality of contents to be stored in the plurality of logical volumes or the plurality of folders, a related contents management step for managing the core-contents and one or more related contents associated with a part or the whole of the core-contents from a plurality of contents to be stored in the plurality of logical volumes or the plurality of folders, and a group folder creation step for forming a group folder that groups the core-contents and the related contents across the plurality of logical volumes or the plurality of folders.

Thereby, it is possible to associate a plurality of contents stored in separate volumes or individual folders and group such plurality of contents across a plurality of logical volumes or a plurality of folders.

According to the present invention, by grouping a plurality of contents across volumes or across folders in a storage system in which such plurality of contents are arranged in different folders of different file types, contents can be referred to from any host system, and vexatious complication of administrators and operators concerning the management and setting of access authority can be reduced.

DESCRIPTION OF DRAWINGS

FIG. 3 is a chart showing a storage management table according to an embodiment of the present invention;

FIG. 17 is a chart of an execution folder having a special function according to an embodiment of the present invention;

FIG. 18 is a chart showing the definition of a request according to an embodiment of the present invention;

DETAILED DESCRIPTION

(1) First Embodiment

(1-1) Hardware Configuration of Storage System in First Embodiment

Foremost, the hardware configuration of a storage system according to the first embodiment is explained below.

Figure 1:
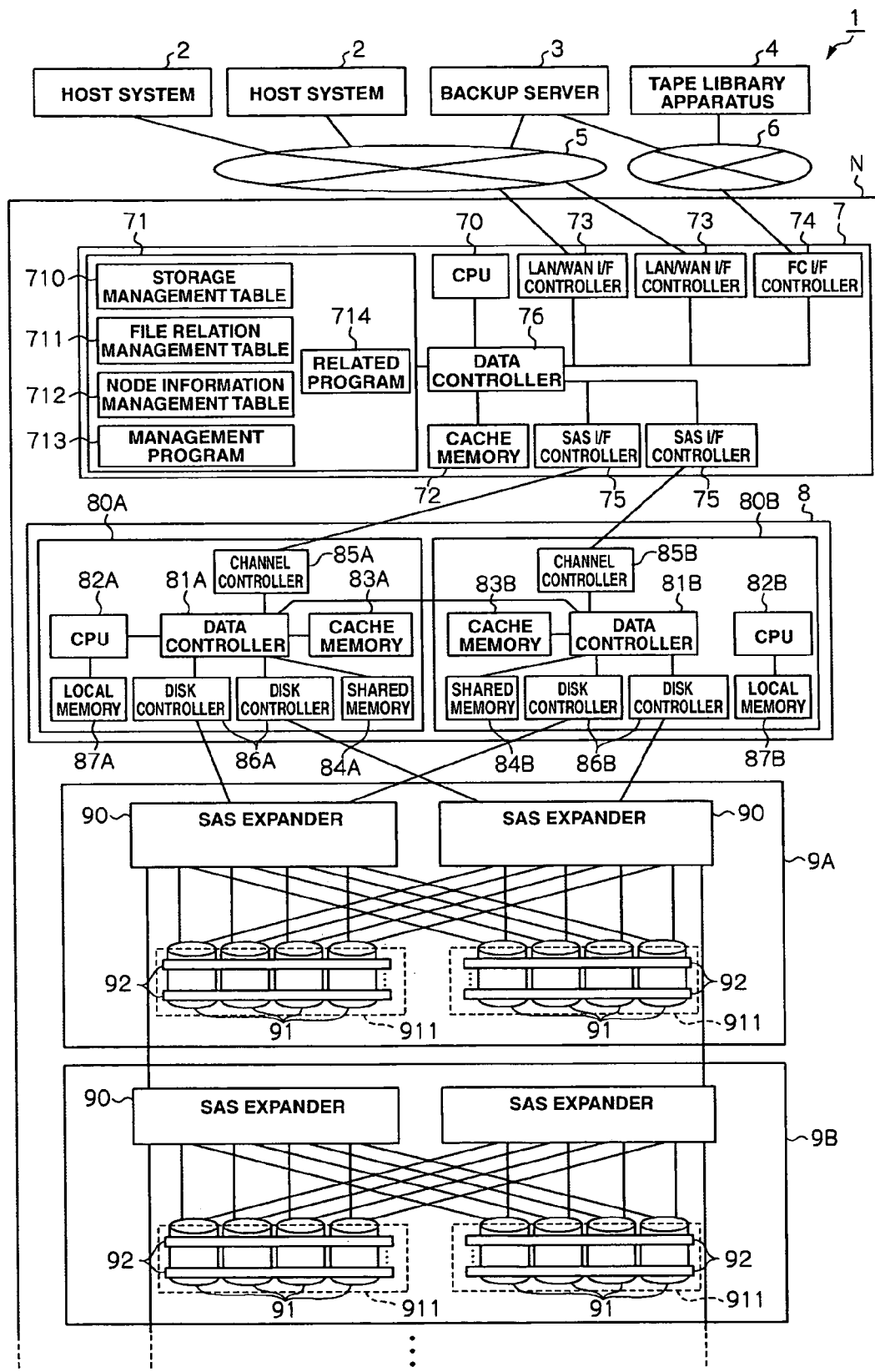
FIG. 1 is a block diagram showing the overall configuration of a storage system according to an embodiment of the present invention.

FIG. 1 shows the overall storage system 1 of the first embodiment.

The storage system 1 is configured by a host system 2 and a backup server 3 being connected to a NAS controller 7 via a first network 5, the backup server 3 and a tape library apparatus 4 being connected to the NAS controller 7 via a second network 6, the NAS controller 7 being connected to a storage controller 8, and the storage controller 8 being hierarchically connected to a first additional chassis 9A and a second additional chassis 9B.

Each apparatus of the storage system 1 configured as described above is now explained.

The host system 2 corresponds to a personal computer, a workstation, a mainframe or the like. The host system 2 comprises hardware resources such as a CPU, a local memory, an interface and a local I/O device, and these are mutually connected via an internal bus. The host system 2 also comprises software recourses such as a device driver, an operating system (hereinafter referred to as an "OS"), and an application program.

Thereby, the host system 2 executes various programs under the control of the CPU and realizes desired processing based on the cooperative operation with the hardware resources. Specifically, the host system 2 executes the application program in the OS under the control of the CPU. An application program is a program for realizing processing intended by the user to be executed by the host system 2. The application program requests access such as the reading or writing of data from and to the storage controller 8 upon its execution. The host system 2 delivers the access from the application program as a command to the storage apparatus, and delivers the data read from the storage controller 8 to the application program. The various programs may be configured as a single module, or configured as a plurality of modules.

The backup server 3 is a computer device used for managing the tape library apparatus 4 and the additional chassis 9 for the administrator to store backup data. The backup server 3 comprises a CPU for controlling the backup data, a memory for storing the control program, an interface and the like.

The tape library apparatus 4 comprises a CPU for controlling the transport mechanism for transporting the archive or backup tape, a memory for storing the control program for controlling the transport mechanism, a transport mechanism, a tape drive, and a tape.

The first network 5 and the second network 6, for instance, are configured from a SAN (Storage Area Network), a LAN (Local Area Network), a WAN (Wide Area Network), Internet, a public line or a dedicated line. For example, when the network is a LAN or a WAN, communication is conducted according to a TCP/IP (Transmission Control Protocol/Internet Protocol) protocol, and, when the network is a SAN, communication is conducted according to a fibre channel protocol. Here, the first network 5 is configured from a LAN or a WAN, and the second network 6 is configured from a SAN using a fibre channel.

The NAS controller 7 is configured by a CPU 70, a memory 71, a cache memory 72, a LAN/WAN I/F control unit 73, an FC (Fibre Channel) I/F control unit 74, and a SAS (Serial Attached SCSI) I/F control unit 75 being connected via a data controller 76. The NAS controller 7 controls the I/O processing between the host system 2 and the storage controller 8.

The memory 71 operates as the main function of the CPU 70. The memory 71 stores a storage management table 710, a file relation management table 711, a node information management table 712, a management program 713 for controlling the various management tables, and a files-relation control program 714 for connecting or disconnecting a relation between files and folders/volumes. The various tables 710 to 712 will be described later in detail.

The cache memory 72 is used for temporarily storing I/O data between the host system 2 and the storage controller 8. A request sent from the host system 2 is once retained in the cache memory 72, and data read from the SAS hard disk 91 is once retained in the cache memory 72 upon being sent to the host system 2 via the storage controller 8.

The LAN/WAN I/F control unit 73 has an I/F function for controlling the I/O processing between the host system 2 or the backup server 3 and the NAS controller 7 based on a LAN or WAN data transfer system.

The FC I/F control unit 74 has an I/F function for controlling the I/O processing between the backup server 3 or the tape library apparatus 4 and the NAS controller 7 based on an FC data transfer system.

The SAS I/F control unit 75 has an I/F function for controlling the I/O processing between the NAS controller 7 and the storage controller 8 based on the SAS data transfer system.

The storage controller 8 is used for controlling the SAS hard disk 91 in the additional chassis 9 (as the main chassis) to be connected to the storage controller 8, and is configured by the controller unit 80 being duplexed. The respective controller units 80A, 80B are connected by the respective data controllers 81A, 81B.

The controller unit 80 is configured by a CPU 82, a cache memory 83, a shared memory 84, a channel control unit 85, and a disk control unit 86 being connected via a data controller 81.

The CPU 82 is connected to a local memory 87 for storing various programs.

The cache memory 83 is used for temporarily storing I/O data between the NAS controller 7 and the SAS hard disk 91.

The shared memory 84 is a storage memory to be shared by the channel control unit 85 and the disk control unit 86. The shared memory 84 is used for consistency of cached data between the storage controllers 8, and communication with the opponent's storage controller 8 based on the controller's owner authority to execute the received request, or for storing system configuration information and various control programs read from the system volume upon turning on the power of the storage controller 8, or requests from the NAS controller 7.

The channel control unit 85 is configured from a plurality of channel adapters (not shown), and configured as a microcomputer system comprising a microprocessor, a local memory, a communication interface and the like, and comprises a port (not shown) for connecting to the SAS I/F control unit 75. The channel control unit 85 interprets the various requests sent from the NAS controller 7 and executes required processing. A network address (for instance, a SAS address or WWN) for identifying the respective ports is allocated to the ports of the channel control unit 85.

The disk control unit 86 is configured from a plurality of disk adapters (not shown). The disk control unit 86 is configured as a microcomputer system comprising a microprocessor, a memory and the like, and functions as an interface for performing protocol control upon communicating with the additional chassis 9. The disk control unit 86, for instance, is connected to the additional chassis 9 via an external SAS cable, and sends and receives data to and from the additional chassis 9 according to a SAS protocol such as SSP (Serial SCSI Protocol) or STP (Serial ATA Tunneled Protocol), or SMP (Serial Management Protocol).

The additional chassis 9 comprises SAS expanders 90 and SAS hard disks 91. The first additional chassis 9A and the second additional chassis 9B are connected between their respective SAS expanders 90.

The SAS expander 90 comprises a plurality of ports, and is connecting the SAS hard disks 91 to the respective ports based on a point-to-point system. The SAS expander 90 is a repeater and functions as a type of switching device, and arbitrates and switches the data communication between the storage controllers 8 and the SAS hard disks 91.

Each of the plurality of SAS hard disks 91 is a hard disk drive capable of understanding commands according to a SAS protocol.

A logical volume based on one or more RAID systems (hereinafter referred to as "RAID volumes") are defined in the storage areas provided by the SAS hard disks 91. Data from the host system 2 is read from and written into this logical volume in block units of a prescribed size via the NAS controller 7.

The RAID volume configuring each logical volume is allocated with a unique identifier (e.g. LUN: Logical Unit Number). In this embodiment, the input and output of user data is performed by using the combination of this identifier and a unique block number (LBA: Logical Block Address) allocated to the respective blocks as an address, and designating such address. The number of RAID volumes to be allocated to one logical volume is not limited to one. One logical volume may be configured by configuring a plurality of RAID volumes across a plurality of storage apparatuses.

The type of logical volume attribute can be broadly classified into a real logical volume and a virtual logical volume.

A real logical volume (hereinafter simply referred to as a "real volume") is a logical volume corresponding to the allocated storage area (RAID volume 911), and is able to actually input and output data.

Contrarily, a virtual logical volume (hereinafter simply referred to as a "virtual volume") is a virtual logical volume that does not necessary correspond to the allocated storage area.

(1-2) Conceptual Configuration of Logical Volume

Figure 2:
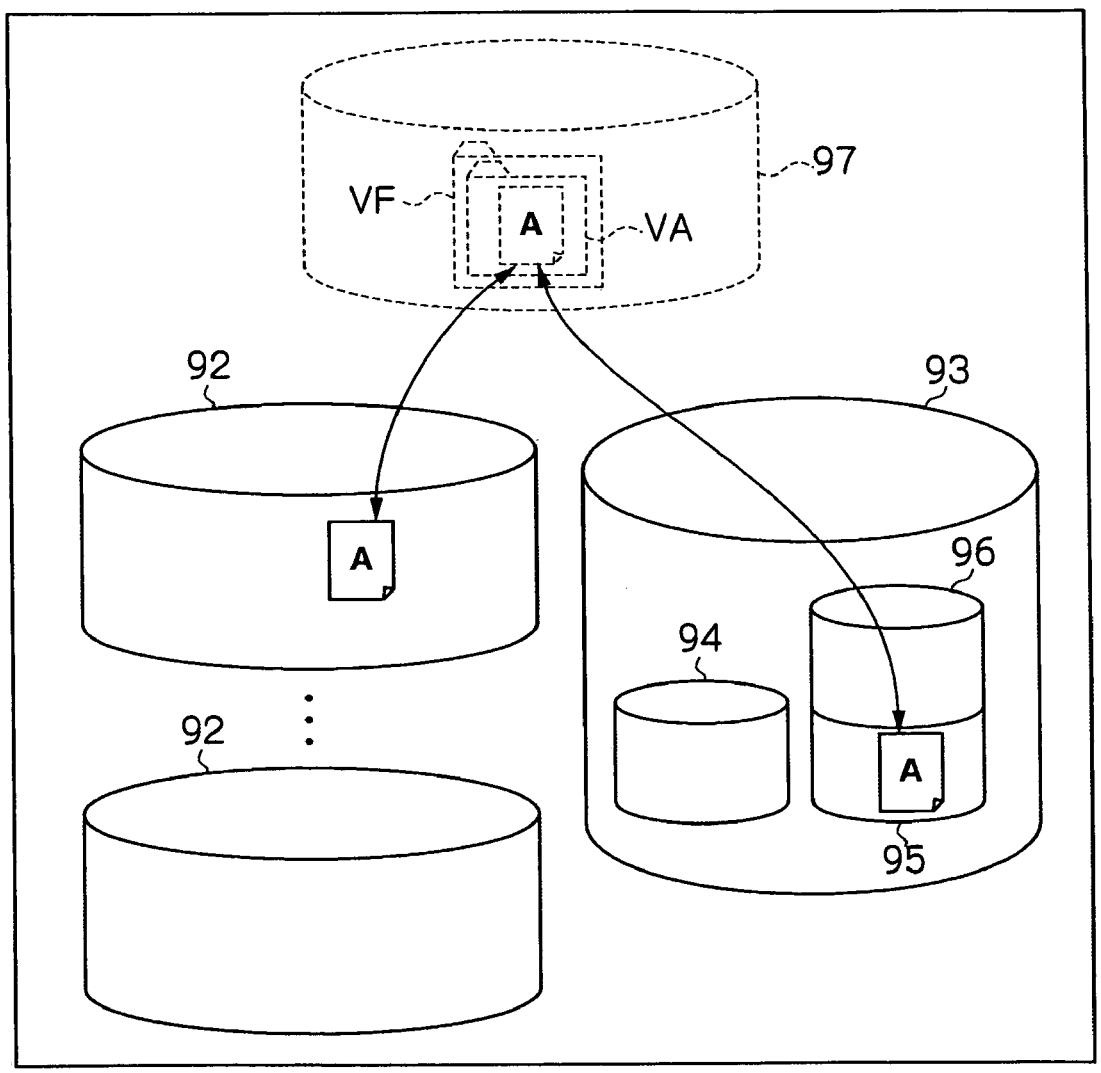
FIG. 2 is a conceptual diagram showing the configuration in a logical volume according to an embodiment of the present invention.

As shown in FIG. 2, a case of selecting a volume as an arbitrary RAID volume 911 among a plurality of RAID volumes 911 to be provided from the storage areas of a plurality of SAS hard disks 91 is now explained. When the attribute of the arbitrary logical volume is a real volume, this real volume comprises a normal logical volume 92 for storing data from the host system 2, and a metadata storage volume 93 for storing metadata relating to the relevant file.

When the attribute of the arbitrary logical volume is a virtual volume, the virtual volume comprises a specified volume 97 having a function for realizing a virtual folder.

The metadata storage volume 93 includes a management table storage area 94 for storing the management tables 710 to 712, a virtual object data storage area 95 for storing the real data of the file to be used only in the virtual folder, and a snapshots data storage area 96 for storing old data to be subject to a snapshot.

The virtual folder VA is a folder created virtually by the function of the NAS controller 7 when a file (hereinafter referred to as a "main file A") to become the core (main content) for performing files-(contents)-relation across folders or across volumes is created. The files in the virtual folder VA are related with the real file A stored in the virtual object data storage area 95 or the normal real volume 92. Further, the virtual folder VA is a folder to be created for the sake of convenience to improve the usability based on visualization of the relation operation of this invention, and is not a folder that is created consciously by the user. Nevertheless, the virtual folder VA is devised to enable customization such as a name change based on the user's operation. Inside the virtual folder VA, a real-body file (hereinafter simply referred to as a "real file") existing in a individual real folder and a virtual-body file accessible only in the virtual folder VA are arranged accessibly, and visualized on a display of the host system 2 (based on a function of the OS or the like).

A virtual-body file is the main file A itself or an updatable file related to the main file A, and which visualizes as a file a link pointer to data that cannot be referred to other than in the virtual folder VA, or to real file data to be referred to. The update of the virtual-body file is executed in the virtual object data storage area. There are cases when the virtual-body file is created by storing link information in the real file and attribute information in the virtual folder VA, and cases when it is created pursuant to the actual data operable only in the virtual folder VA.

In addition, the virtual-body file includes files having the two types of functions described below.

One is a virtual-body file referred to as a portability file capable of reconstructing the configuration of a virtual folder VA created on a certain NAS controller 7, storage controller 8 and additional chassis 9 in another NAS storage (hereinafter referred to as the "NAS storage N"). A portability file is a file that virtualizes the main matter of the file relation management table 711 described later for the user.

Further, the other one is a virtual-body file referred to as a snapshot file capable of reconstructing the virtual folder VA at a certain point in time. A snapshot file is a file storing a link pointer (data location information) to the main file at a certain point in time and to the file related with such main file configuring the virtual folder VA at a certain point in time.

These virtual-body files store location information of the latest data, or data at a certain point in time, of the main file A and the relevant file containing the file A stored in the virtual object data storage area 95.

The NAS storage N providing the virtual folder VA reads or writes a real file from the NAS storage N storing original data or reads or writes data of the virtual-body file based on the location information of the main file A and the relevant file. Nevertheless, when the virtual-body file is a snapshot file, writing is inhibited. Here, the NAS storage N storing the original data will issue an error report in response to the write request of the host system 2. Incidentally, when using the virtual folder VA in another NAS storage N, it would be desirable from a security standpoint, to make the setting so that certification is conducted between the source NAS storage N and the destination NAS storage N.

The various management tables 710 to 712 to be stored in the management table storage area are used by being entirely or partially, as needed, read into the memory 71 of the NAS controller 7. The details are explained below.

(1-3) Relation Function in Present Embodiment (1-3-1) Configuration of Memory

The tables to be stored in the memory 71 of the NAS controller 7 according to the present embodiment are now explained.

[Storage Management Table]

The storage management table 710, as shown in FIG. 3, is a table for managing the location of the files stored in the storage controller 8 to be connected under the NAS controller 7. The storage management table 710 is a table primarily used for converting a file access request from the host system 2 into a block access request so as to enable access to the RAID volume 911 configured in the SAS hard disk 91.

Figure 4:
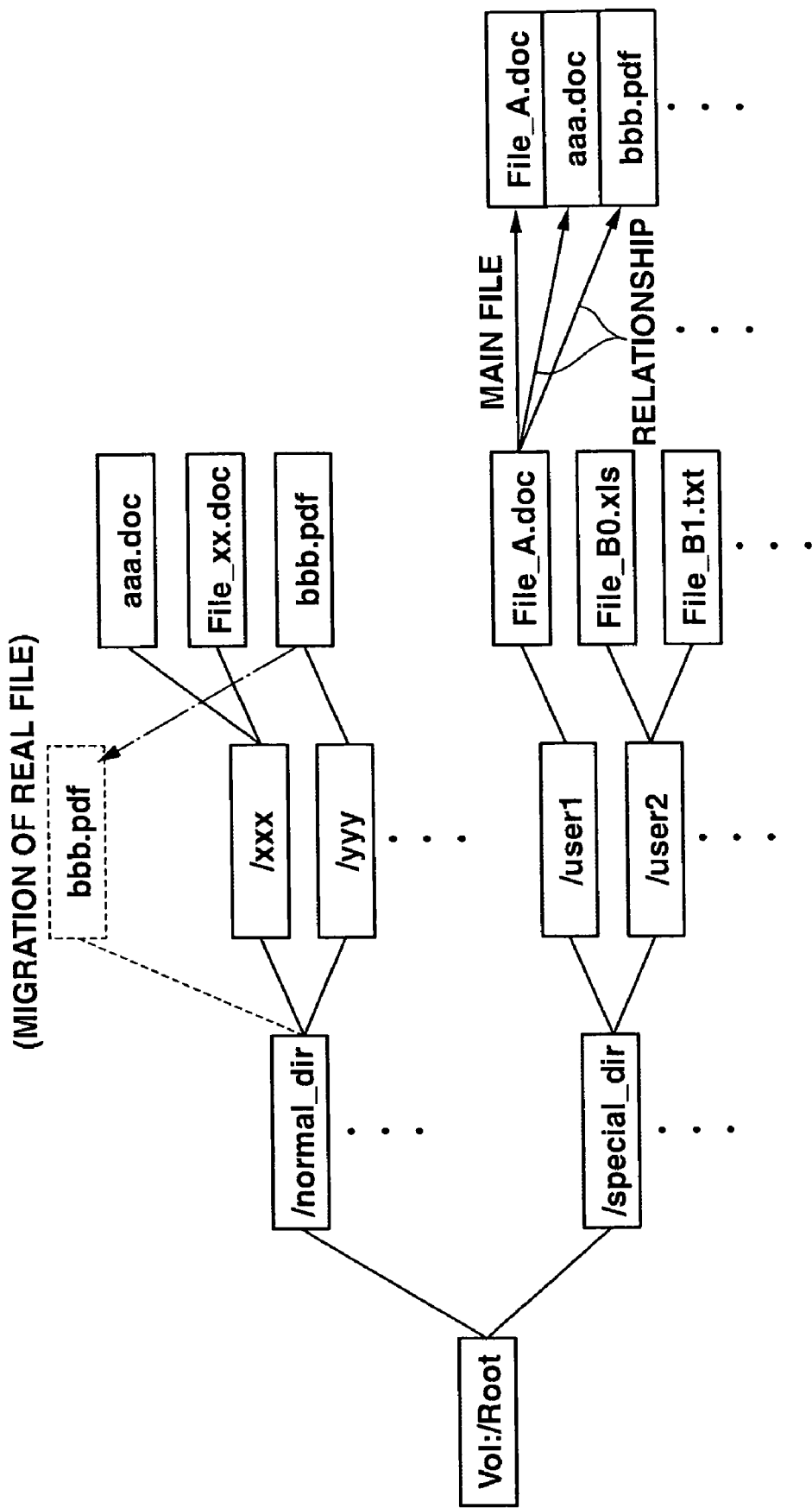
FIG. 4 is a model diagram of a node tree according to an embodiment of the present invention.

FIG. 4 shows a model diagram of a standard node tree. Foremost, this model diagram shows that a "/Root" node has a pointer to a directory node represented with "/normal_dir" and "/special_dir." Similarly, the directory node of "/normal_dir" has a pointer to a node at a hierarchy that is one level lower. "File_A.doc" at the lowest hierarchy has a relevant file. Further, this file is a target file to be stored in the virtual-body file storage area. The other files at the lowest hierarchy are files to be stored in a normal logical volume 92. Further, for instance, a real file such as "bbb.pdf" can be moved up to a hierarchy that is one level higher.

This node tree model is managed in the following storage management table 710.

Returning to FIG. 3, the storage management table 710 comprises a "volume ID" field 710A, a "path name" field 710B, a "file name" field 710C, a "data length" field 710D, an "attribute information" field 710E, a "physical apparatus ID" field 710F for storing the ID of a storage destination apparatus, a "LUN" field 710G for storing a logical unit number, a "top LBA" field 710H for storing a top LBA (Logical Block Address) of the file storage location in the LUN, a "used data length" field 710I for storing the used data length, and a "link table" field 710J for storing relevant location information when a fragment arises in a file and a portion of such file is stored in a different location.

The "volume ID" field 710A stores an identification ID for identifying the logical volume to be accessed by the host system 2. Further, the "path name" field 710B stores the path name of the files. Moreover, the "file name" field 710C stores the file names. The "data length" field 710D stores the length (byte length) of the file data. The "attribute information" field 710E stores, in addition to the attribute information parameter described later with reference to FIG. 5, information required for identifying whether the target file is a normal real file or a main file or a relevant file configuring a virtual folder, and handling the expanded function. For instance, when the target file is stored in a normal real file, the attribute information 10 of "normal" is stored, and when the target file is stored in a virtual-body file, the attribute information 11 of "expanded" is stored.

Therefore, the virtual-body files arranged in the virtual folder VA can be identified by setting a target flag (for instance, "expanded") in the attribute information section. Thus, when there is any change in the "path name" or "file name" of a file with a flag-on, if information before the change is searched from the metadata and the location information thereof is automatically corrected, the virtual folder will not be affected. Similarly, even when deleting a file, it is also possible to migrate data to the virtual object data storage area 95 and automatically correct the metadata.

Figure 5:
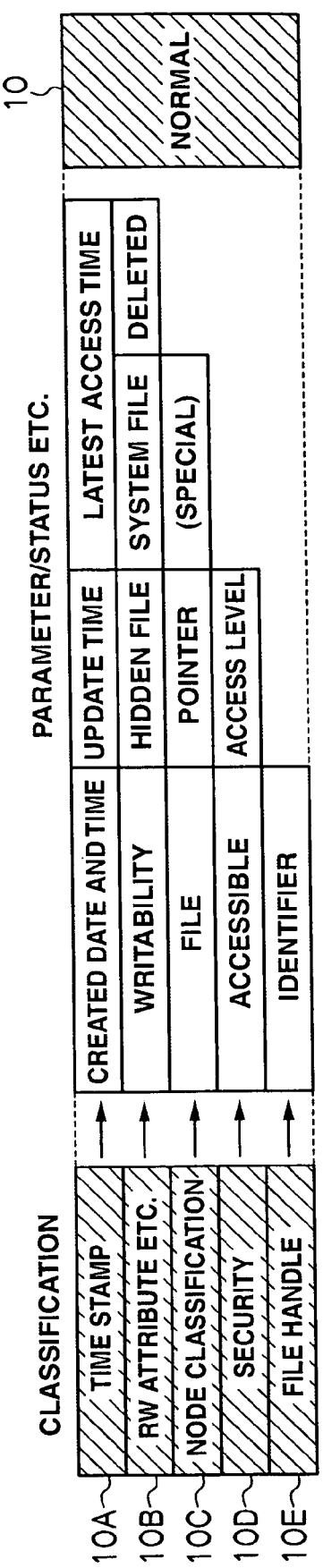
FIG. 5 is a chart showing a part of the storage management table according to an embodiment of the present invention.

Here, as shown in FIG. 5, there are the following types of information that are contained in the attribute information 10 of "normal." Information contained in the attribute information 10 of "normal" includes time stamp information 10A, RW attribute information 10B, node classification information 10C as the node type and location information, security information 10D and file handle information 10E.

The time stamp information 10A also contains information showing the parameter/status such as the created date and time, update time and latest access time. Further, the RW attribute information table 10B contains information showing the parameter/status such as the writability, hidden file, system file, deleted and so on from the host system 2. The node classification information table 10C contains the parameter/status such as a file (node type), a pointer (node pointer), a specified file or special information showing the meaning of a specified volume. The security information 10D contains accessible and access level information. The file handle information 10E contains identifier information.

Figure 6:
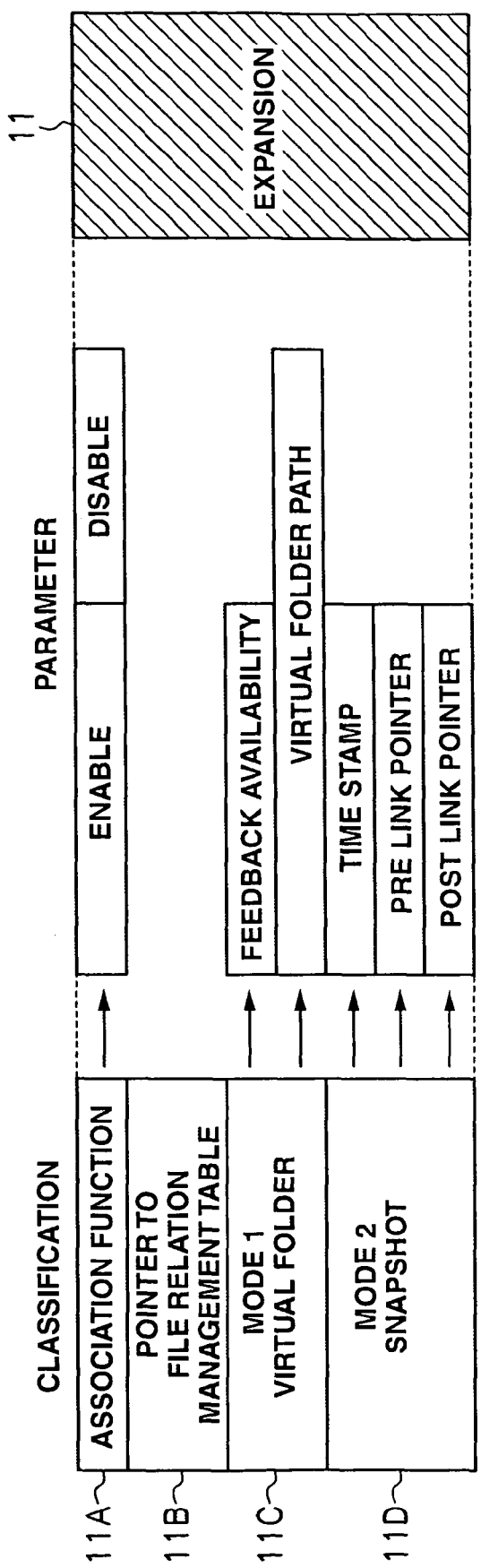
FIG. 6 is a chart showing a part of the storage management table according to an embodiment of the present invention.

Further, as shown in FIG. 6, information contained in the attribute information 11 of "expanded" includes association function information 11A, file relation management table pointer information 11B as the pointer information to the file relation management table 711, mode 1/virtual folder information 11C, and mode 2/snapshot information 11D.

Moreover, the file relationship function information 11A contains information showing the function status such as file relationship enabled or file relationship disabled as the parameter.

The mode 1/virtual folder information 11C contains information such as a feedback availability flag showing whether the operation in the virtual folder VA will be reflected in the real file, and a virtual folder path showing the location of the virtual folder VA.

The mode 2/snapshot information 11D contains information such as a time stamp, a pre link pointer showing the pointer to a previous snapshot file, and a post link pointer showing the pointer to a subsequent snapshot file.

Returning to FIG. 3, since the other fields 710F to 710J of the storage management table 710 are location information of the files, the detailed explanation thereof is omitted.

[Relevant-Files Management Table]

The file relation management table 711 is a table for managing the relationship of files to be grouped regarding a plurality of files stored in various volumes and folders, and is a feature point of the present invention.

Figure 7:
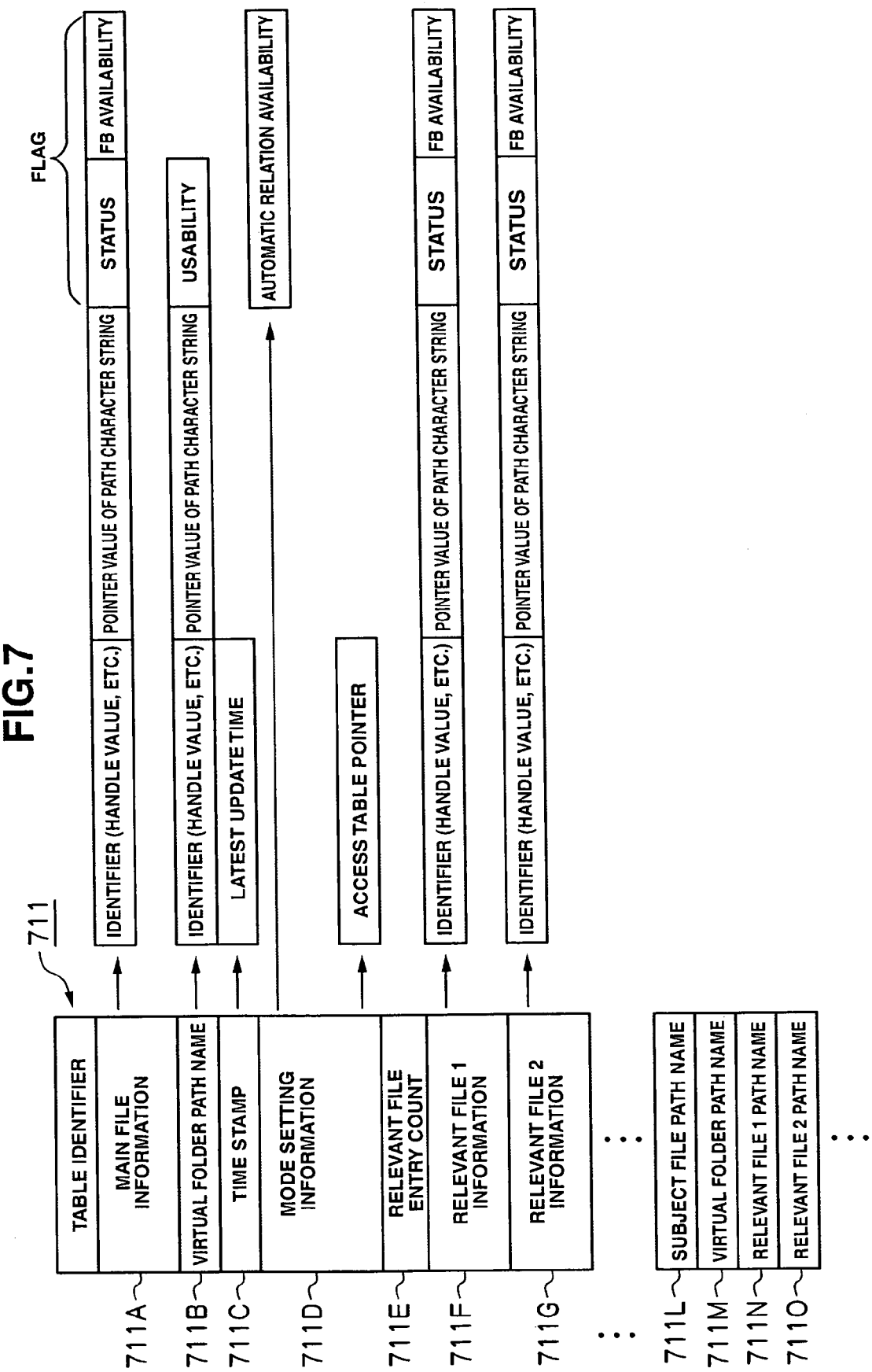
FIG. 7 is a chart showing a file relation management table according to an embodiment of the present invention.

The file relation management table 711, as shown in FIG. 7, comprises main file information 711A as a file to become an arbitrarily selectable core for grouping as a table identifier, virtual folder path name information 711B showing the location of the virtual folder created under the virtual volume, time stamp information 711C, mode setting information 711D showing the security setting, file relation entry count 711E showing the number of registrations of relevant files, file relation information 711F, 711G showing the information of various relevant files, and main file path name information 711L, virtual folder path name information 711M, relevant file path name information 711N, 711O . . . storing information showing the location of other various files and folders.

The table of the main file information 711A further contains an identifier (for example, a handle value) of the main file, a pointer to the path character string storage area containing the file name showing the location of the main file, status showing the file status or type, and information on feedback availability showing whether the operation in the virtual folder will be reflected in the real file. The foregoing status contains metadata for a real file or a virtual object, type of file such as a folder, and file status such as the deletion status, write prohibited or normal (normal or readable/writable). The relevant file information 711F, 711G, as with the main file information 711A, similarly contains an identifier, a pointer to the path character string storage area showing the location of the relevant file, and information on the status and feedback availability. Not only does the foregoing information enable access to the files stored in the normal volume and folder, it also enables access to the file data in the virtual object data storage area 95.

Further, the virtual folder path name information 711B contains an identifier configured from a hashing value or handle value of the path name, a pointer to the path character string storage area of the virtual folder VA, and information on the usability of the virtual folder VA.

The time stamp information 711C contains information on the latest update time, which is the latest date and time that the table was updated.

The mode setting information 711D contains automatic relation availability showing whether to automatically relate files in the NAS storage N through the user's operation, and pointer information to the access table to be used in the access security control to the virtual folder VA.

Incidentally, in this embodiment, information on the foregoing status, feedback availability, usability, and automatic relation availability is subject to bit control based on a flag.

[Node Information Management Table]

The node information management table 712 is a table for managing the location information of files, and is omitted here. A representative example of this table would be an inode.

(1-3-2) File Relation Control Routine of Present Embodiment

As a specific operation under the NAS environment of the present embodiment, when a certain specified file and a file node (location information) of a file related with such specified file and the target file are virtual-body files, these virtual-body files are stored in the virtual object data storage area 95 used for storing metadata and real data, and the file group that was grouped based on the metadata can be provided to the host system 2, or provided to an apparatus that performs backup operation or archive operation, or provided to another NAS storage N.

The trigger for executing the relation of a certain specified file and another file is a request issued from the host system 2 based on the user's operation. As the method of relation, there is a method by API based on the OS or application of the host system 2, and a method by operations such as the writing in or updating of a virtual folder VA, or the deletion of files.

The respective methods for relating a specified file and another file are explained below.

(1-3-2-1) Routine 1. Method of the File Relation Control API

In this embodiment, when realizing the method of performing the file relationship control API (Application Program Interface) based on the OS or application of the host system 2, both the host system 2 and the NAS storage N are implemented with a function to perform processing corresponding to the relation connection of files, relation disconnection of files, disable (suppression) function of relation, reporting to the host system on the node list of relevant files (including folders if appropriate), opening a real folder containing the file corresponding to the node based on the reported node list, opening the file corresponding to the node based on the reported node list from an application, referral on the Web browser, and I/O in an operable hyper text format.

Incidentally, a node list is an enumeration of the file node information of the target contents group. The method of relation using API is explained below.

[Processing 1. Function Definition, Region Configuration]

Specifically, the administrator foremost sets in the NAS storage a specified volume 97, a virtual folder VA or a specified folder VF for performing the foregoing processing in the host system 2. Here, a specified volume 97 or a specified folder VF is a virtual volume or a virtual folder to be provided for realizing the file relationship control function of contents (files) across folders or across volumes. Incidentally, these may also be realized with a real volume or a real folder. Files that are visualized in the specified volume 97 or the specified folder VF are related with the files or data to be stored in the real volume 92 or the virtual object data storage area 95. Further, the foregoing virtual folder VA is created in the specified folder VF in a default status. Incidentally, it is also possible to subsequently change the location to a different location based on the user's setting (change of path name, etc.). Here, the following processing is explained assuming that the administrator set the specified folder VF.

However, since this setting is to be made for the NAS storage N to identify the target specified file, this may also be set as a part of the individual file attributes. Further, although all files in the NAS storage N may be targeted, it is necessary to keep in mind that the metadata could become a rather large capacity when all files are targeted.

[Processing 2. Creation of Metadata Entry]

The operator (user) operates the host system 2 and creates a main file A to become the core of the file group to be grouped in a specified folder set in processing 1, or creates the main file A by copying or migrating the files stored in the arbitrary folder to the specified folder VF.

Here, a write file request is issued from the host system 2 to the NAS storage N. The NAS storage N that received this request determines whether the request was issued to a file in the specified folder VF, and creates a new entry of metadata corresponding to the file when it determines that the request was issued to a file in the specified folder VF. In other words, based on the operator's (user's) operation, the NAS storage N, as shown in FIG. 7, stores the main file A information and the information 711A to 711D, 711L and 711M to be associated with such information.

Incidentally, when the request was not issued to a file in the specified folder VF, data is written into a file of a normal folder according to the write request from the host system 2.

[Processing 3. File Relation Request]

Subsequently, when the operator (user) copies and pastes information from another file Z while opening the main file A, the host system 2 sends the inode information of the copy source file Z and the inode information of the copy destination file A to the NAS storage N. Incidentally, the inode information to be sent at this time may be a part of the relevant information.

Figure 8:
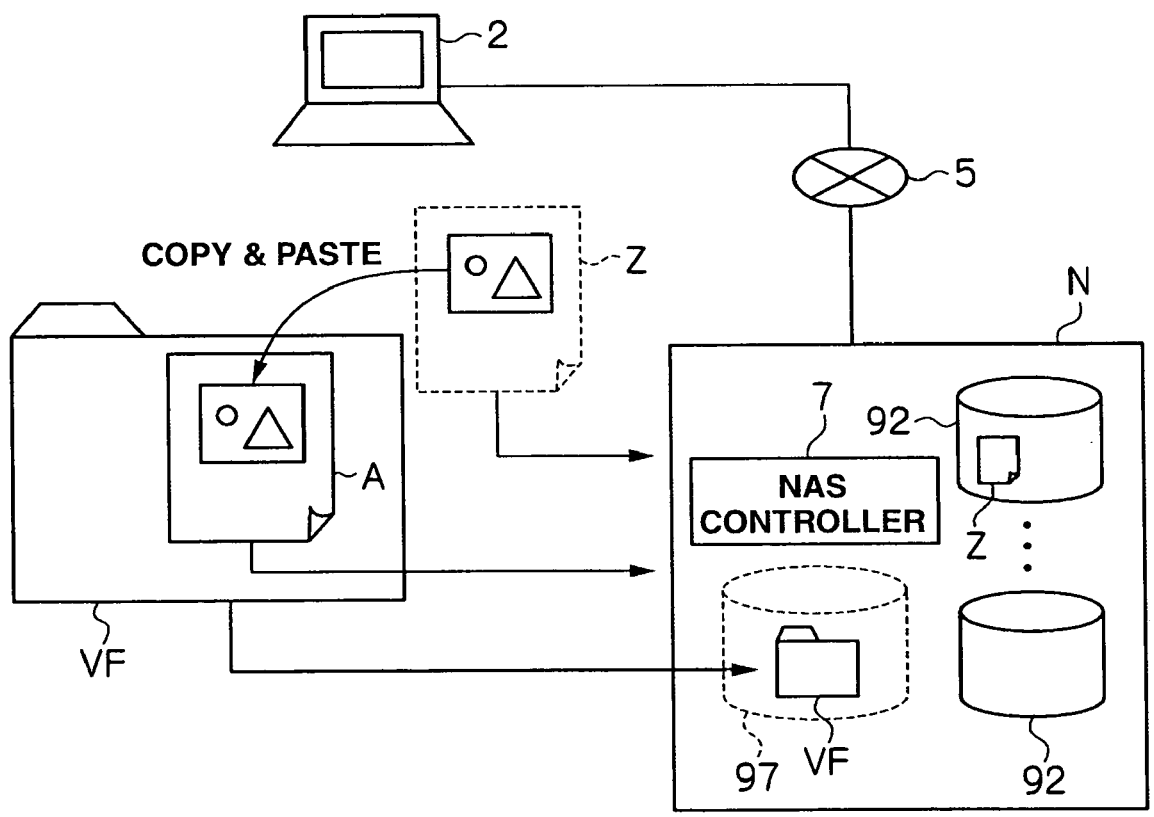
FIG. 8 is a conceptual diagram showing an example of relation connection processing according to an embodiment of the present invention.

FIG. 8 is a conceptual diagram showing a case of updating the main file A by copying and pasting data of the whole or a part of the file Z stored in an arbitrary folder in the normal logical volume 92 of the NAS storage N. The main file A is seemingly stored in the specified volume 97 of the NAS storage N.

[Processing 4. File Relation Processing]

According to processing 3, the NAS storage N searches whether either the copy source file or the copy destination file (these inode information were sent from the host system 2) has an entry in the file relation management table 711, and, when it determines that there is such an entry, the NAS storage N adds the inode information of the other file as the relevant file information 711F to the file relation management table 711. Incidentally, if the file has already been stored in the file relation management table 711, it is not added again.

When the NAS storage N determines that neither the copy source file Z nor the copy destination file A does not have an entry in the file relation management table 711, it determines that they are not files in the specified folder VF, and does not perform any processing.

Further, when the NAS storage N determines that a "read only (relation suppression)" flag is set in the foregoing entry table, it does not perform any processing.

[Processing 5. Output Processing]

The NAS storage N sends the inode list of the created main file A and the relevant file according to a request from the host system 2 based on the operator's (user's) operation.

The request from the host system 2 is issued by the operator operating the screen on the host system 2.

Figure 9:
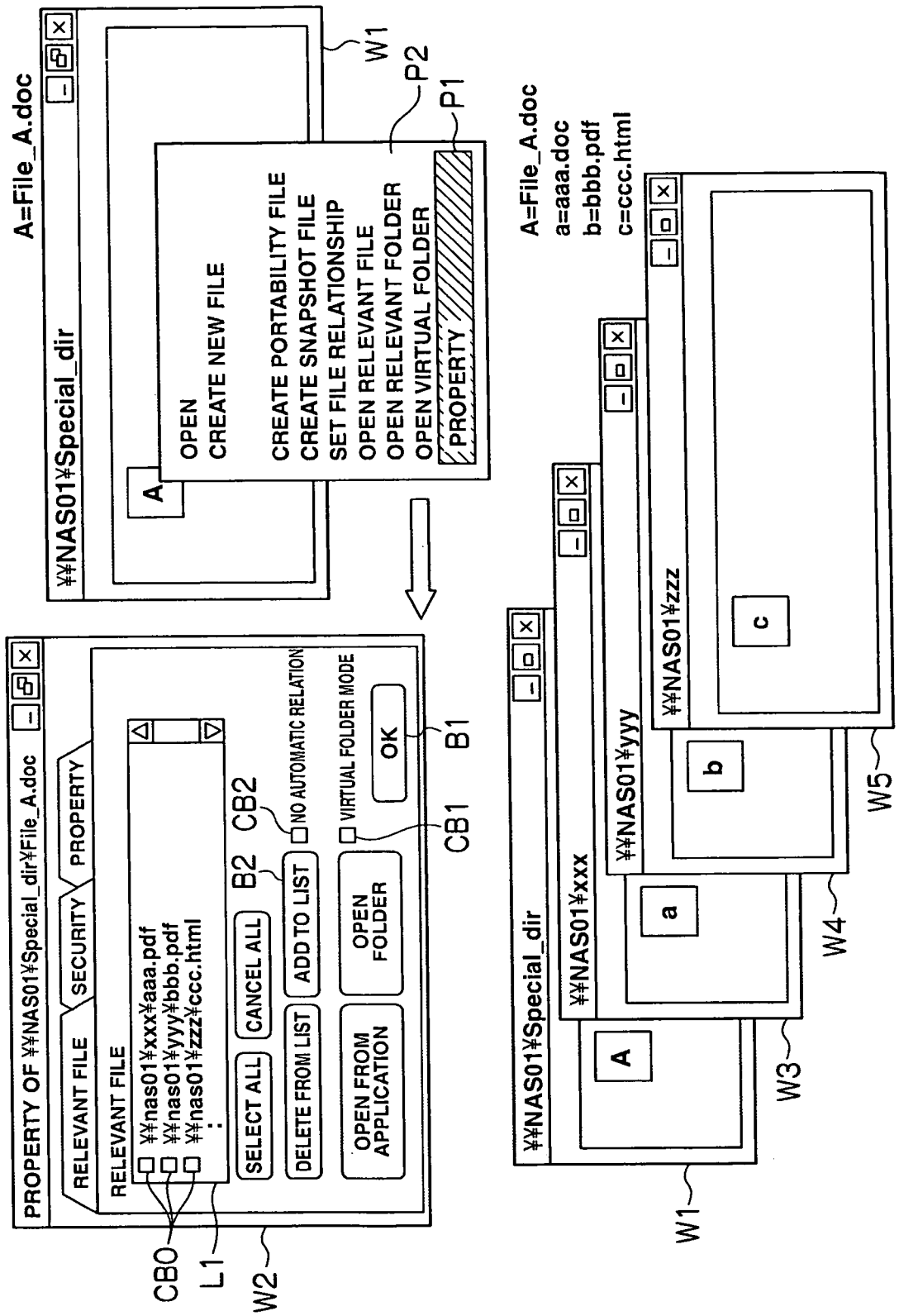
FIG. 9 is a window screen diagram on the host system side according to an embodiment of the present invention.

Specifically, as shown in FIG. 9, the operator right-clicks the main file A in the window W1 of the specified folder VF on the screen of the host system 2 to display a short-cut menu, and moves the pointer to "property" P1 and clicks the mouse to select it, whereby the window W2 screen will open. Inside the window W2, there is a file list display unit L1 actually related with the main file A. Among the files related to the main file A displayed on the file list display unit L1, the operator checks the check box CB0 of the file to be opened, or clicks the "Select All" button just below, then presses the "Open Folder" button.

Or the operator right-clicks the main file A in the window W1 opened with the specified folder VF in the host system 2, and places the pointer at "Open Relevant Folder" P2 of the displayed shortcut menu and clicks the mouse to select and execute the command. Here, as with the case of pressing the "Select All" button, all relevant files of the main file A will be selected.

The NAS storage N sends inode information of the selected file (or the folder to which the file belongs) according to the request from the host system 2. Based on the information received from the NAS storage N, the host system 2 performs processing for opening a window of the real folder, to which the relevant file selected by the user belongs, on the screen.

FIG. 9 shows the window W1 of the specified folder VF to which the main file A belongs and the windows W3 to W5 of the real folder to which the relevant files of the main file A belong based on the execution of the foregoing operation.

[Processing 6. Metadata Modification Processing (Deletion Processing, Relation Processing or Relation Disable (Suppression) Processing)]

By opening the property window W2 of the main file A on the screen of the host system 2, checking the unnecessary file displayed on the file list display unit L1 and pressing the "Delete from List" button, the operator is able to disconnection the relation of files which were needlessly related. Specifically, the host system 2 issues a file relationship disconnection request to the NAS storage for disconnecting the relation of the relevant files, and the NAS storage N that received this request deletes the entry of the files subject to the relation disconnection command from the file relation management table 711.

Files that were not given the opportunity to be related automatically can be related manually based on the operator's operation.

Specifically, as shown in FIG. 9, after opening the property window of the created main file A on the screen of the host system 2, the operator presses the "Add to List" button in the window W2. Then, a dialog box (not shown) for selecting the file will be displayed on the screen of the host system 2, and the operator selects the file to be related and presses the "OK" button, (whereby the dialog box will close,) and the file selected in the file list display unit L1 of the window W2 will be registered. As a result of the operator pressing the "OK" button B1 in the window W2, the relation connection request of the selected file is issued from the host system 2 to the NAS storage N. When the NAS storage N adds a new entry of the file subject to the relation connection command to the file relation management table 711 of the main file A, it will be possible to related the main file A and the relevant file.

Figure 10:
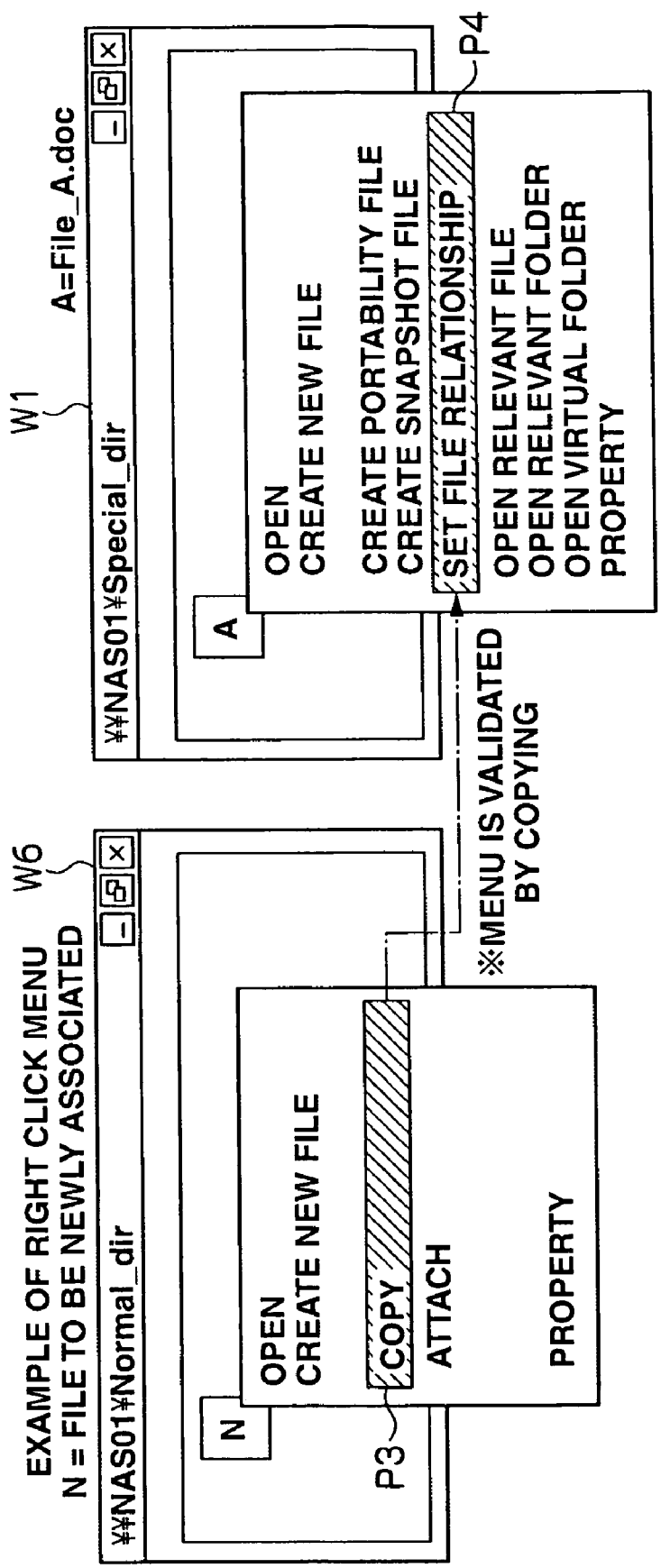
FIG. 10 is a window screen diagram on the host system side according to an embodiment of the present invention.

Incidentally, as shown in FIG. 10, with respect to the target file N to be newly related which is stored in the real folder of the real volume 92 as the normal volume, it is also possible to relate the main file A and the file N by right-clicking the icon of the file N on the folder screen (window) W6, placing the pointer P3 on the "copy" display to select and execute copying, and thereafter selecting and executing the "file relationship" display P4 that will validate (or enable) the short-cut menu of the main file A on the specified folder window W1.

Returning to FIG. 9, when the operator does not wish to relate the files any further, by opening the property window W2 of the created main file A on the screen of the host system 2, checking the check box CB2 of the "Automatic Relation Disabled" and thereafter pressing the "OK" button B1, the operator is able to suppress the subsequent relation. Thereby, the host system 2 issues a file relationship suppression request to the NAS storage N. The NAS storage N that received this request sets the flag 11A (FIG. 6) in the attribute information field 710E of the storage management table 710 to "Relation Disconnected," and ignores the relation request to the main file A based on the request from the host system 2 issued after the setting (or does not perform relation connection processing).

(1-3-2-2) Routine 2. Method of Relating Files Based on File Operation in Virtual Folder The method of relating a certain specified file and another file based on the file operation in the virtual folder VA is now explained. In foregoing routine 1, although the relation was performed based on the operation on the side of the host system 2 and the notification from the host system 2, in routine 2, the NAS storage N performs the relation with file writing in the virtual folder as the trigger.

[Processing 1. Function Definition, Area Setting]

Since processing 1 is the same as the method of setting the specified folder VF using the foregoing API, the explanation thereof is omitted.

[Processing 2. Creation of Entry]

The operator operates the host system 2 to create the main file A to become the main content of files to be grouped in the specified folder VF set at processing 1, or to create the main file A by copying or migrating the files stored in the arbitrary folder to the specified folder VF Here, a write file request is issued from the host system 2.

Figure 11:
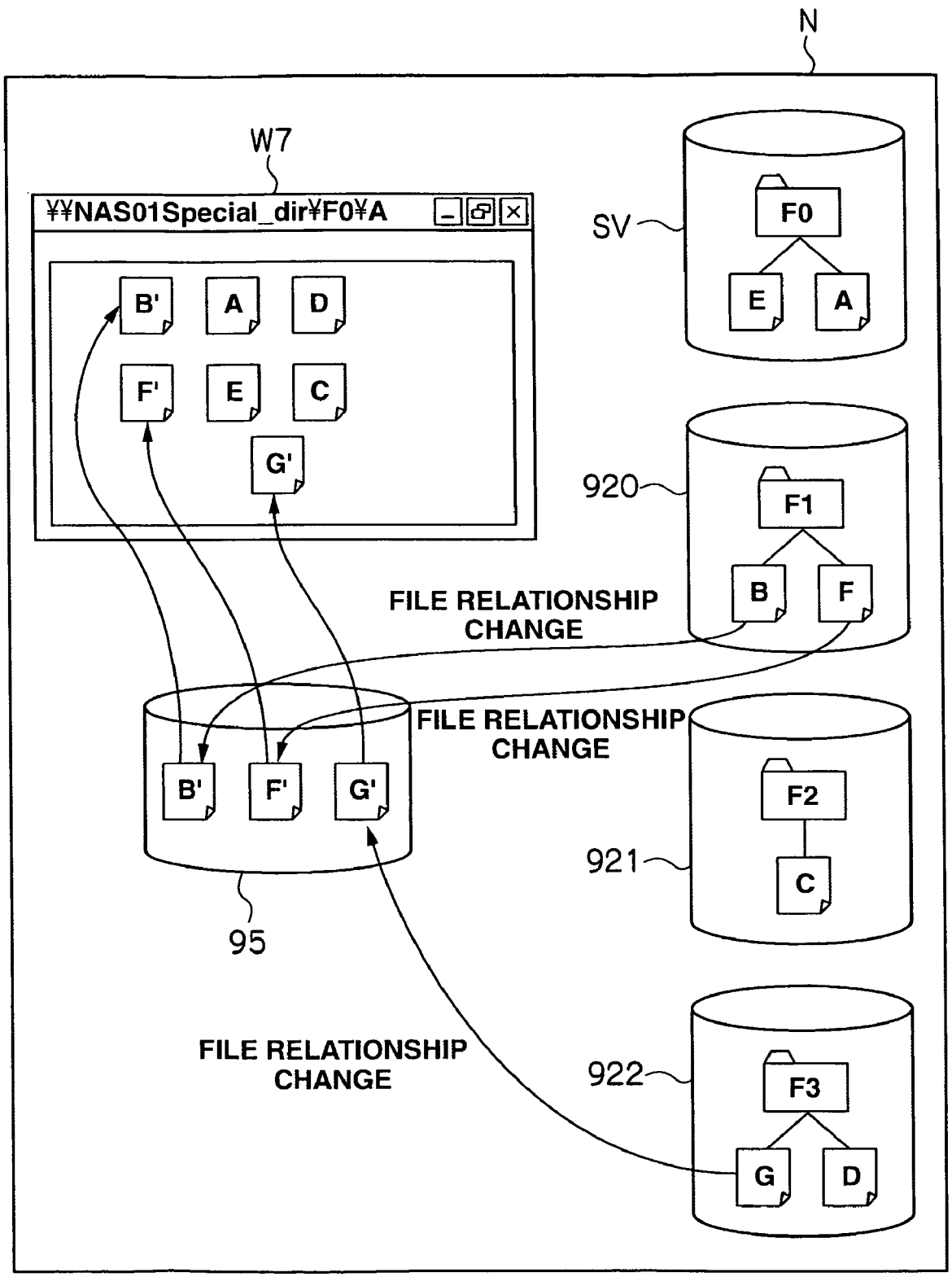
FIG. 11 is a conceptual diagram in a case of changing the file relationship according to an embodiment of the present invention.

For example, as shown in FIG. 11, a case when there is a real file of the main file A in the folder F0 stored in the arbitrary volume SV is now explained. The files B to G shown in FIG. 11 are the files to be related with the main file A.

The normal volume 920 of the NAS storage N has a folder F1 storing the files B, F. The normal volume 921 has a folder F2 storing the file C. The normal volume 922 has a folder F3 storing the files D, G. The NAS storage N, in addition to these normal volumes 920 to 922, has a virtual object data storage area 95 in the metadata storage volume 93.

The NAS storage N that received this request creates a virtual folder VA based on the main file name in the specified folder VF in which the main file A is seemingly stored, and notifies this to the host system 2. Thereby, the operator recognizes that another folder (virtual folder VA) containing the main file A separate to the folder F0 storing a real file of the main file A.

Figure 12:
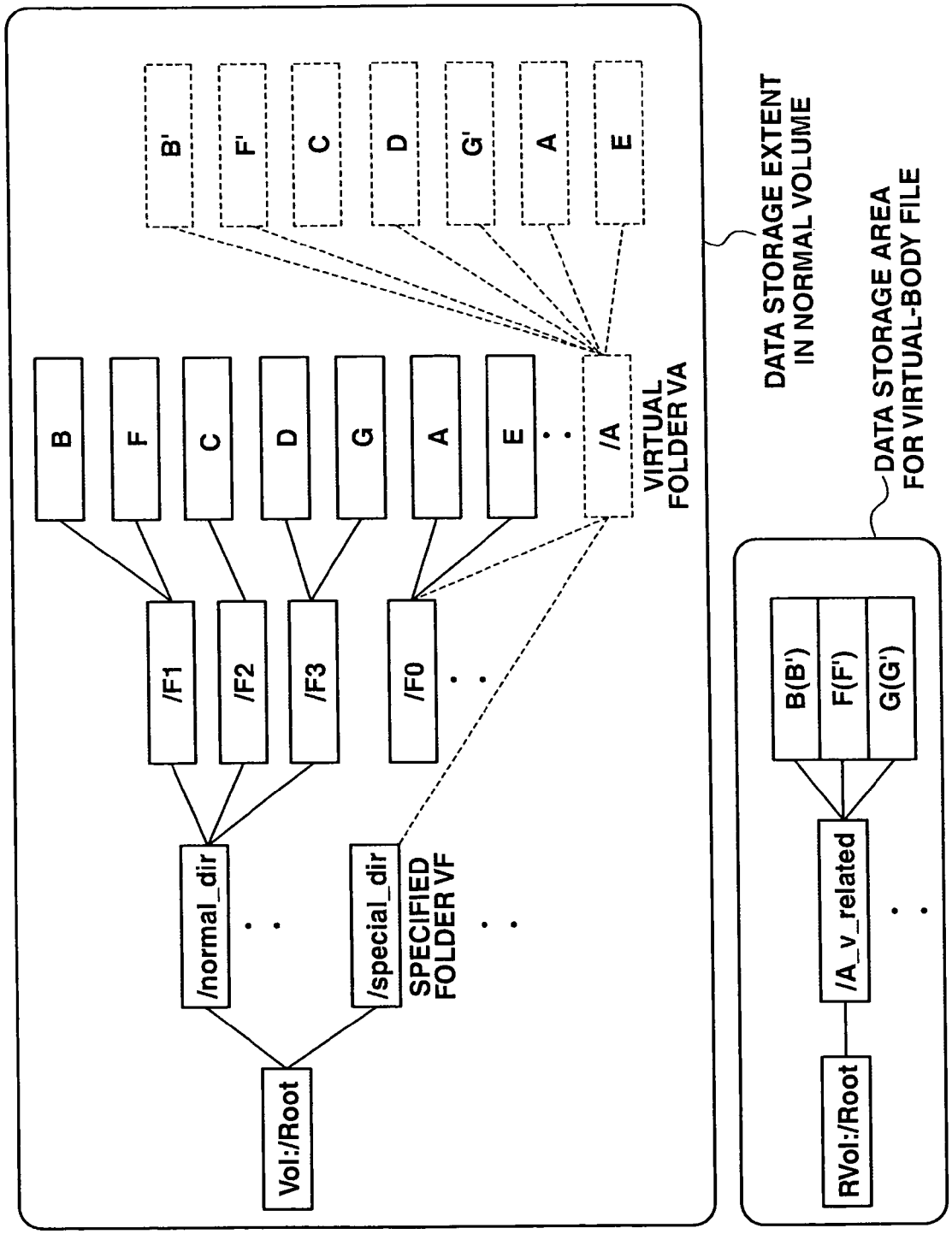
FIG. 12 is a node tree model diagram in a case when a virtual folder is created according to an embodiment of the present invention.

FIG. 12 is a diagram representing FIG. 11 in the form of a node tree. In other words, when the main file A is created in the specified folder VF through operation such as storage or copying, a virtual folder VA containing the main file A is virtually created in the same hierarchy in which the main file A was created. Although the details will be described later, the operator drags and drops each of the relevant files B to G to be grouped in the virtual folder VA from the real folders F1 to F3. Based on this operation, a virtual folder V containing the main file A and the relevant files B to G is created. Among the above, the relation of the files B, F, G is changed to the virtual-body file as a result of being updated by the operator, and the files B', F', G' are arranged in the virtual folder. The dotted lines in FIG. 12 represent the status of the virtual folder VA viewed from the operator.

The files visualized in the virtual folder VA are not real files that exist substantively. When reading the main file A in the virtual folder VA, data is read from the real file stored in the real folder F0.

In the virtual folder VA, for instance, by changing the name of the main file A, it is possible to change the attribution information of the files in the virtual folder by only changing the metadata without affecting the real files stored in the folder F0. Specifically, the character string pointed by the main file information 711A of the file relation management table 711 is changed. Incidentally, with the name change of the main file A as the trigger, the status of the main file information 711A can also be changed from a real file to a virtual-body file. Here, data of the real file is copied to the virtual object data storage area 95.

Further, as shown in FIG. 11, among the files B to G stored in the virtual folder VA, when the relation of the files B, F, G is changed, the location information of the relevant file information of the file relation management table 711 is changed to correspond to another real file or a virtual-body file (data materials B', F', G' of the virtual-body file in the present embodiment) in the virtual object data storage area 95.

Thereby, it is possible to manage the changed files B', F', G' in the virtual folder VA without affecting the real files B, F, G. After the change, the operator is able to access the files B', F', G'. Since it is possible to change the group configuration of data only by changing the association of metadata, it is possible to replace this with an entirely new file.

Further, in a case where the operator changed the storage location of the real file that has been related with the main file A, to enable the operator to refer to the files subject to the location change in the virtual folder without having to manually change the setting each time, a flag is set in the "attribute information" field 710E of the storage management table 710 of the real file in advance upon executing the foregoing relation. Thereby, the file storage management table 710 is referred to when changing the location of the real file, and the related file path name of the file relation management table 711 managing the metadata of the file is also changed simultaneously with the correction to the new location information. Like this, it is possible to automatically retain the location of the real file to be related with the main file A constantly in the latest state. In addition to the foregoing method, the NAS storage N may also search the internal file with a search means.

Figure 13:
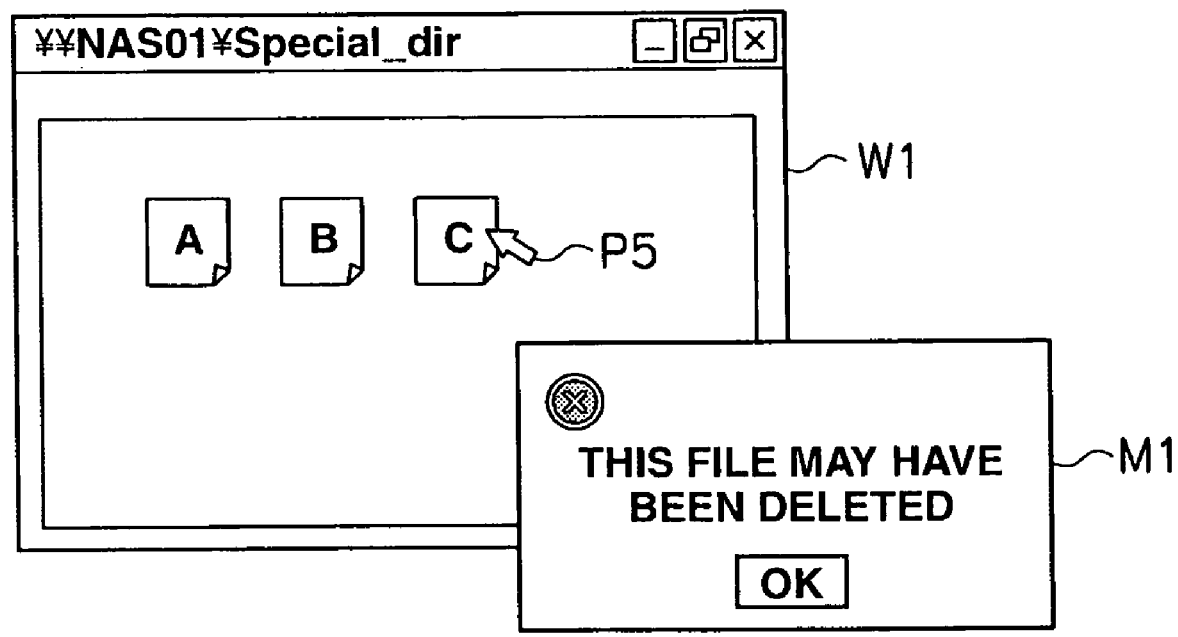
FIG. 13 is a screen diagram on the side of the host system in a case of changing the storage location of a file according to an embodiment of the present invention.

Without performing the foregoing process, for instance, as shown in FIG. 13, if the operator places the pointer P5 on the icon of the file C displayed on the window W1 in the virtual folder VA and double-clicks such icon, although a read request of the file will be issued to the NAS storage N, since only a real file exists in the path location (folder) showing the metadata as a result of the previous real file being subject to a location change, it is possible to notify the operator with a message M1 concerning the file C that can no longer be opened.

Further, since it is possible to set an attribute that is different from the real file, for instance, the extension of the real file can be changed so that the operator is not able to specify and edit an application in the folder on the real file side, and enable the operator to edit files only in the virtual folder VA. To summarize the above, it is possible to keep the real file uninfluenced even when the file name is changed or a file is deleted in the virtual folder VA. Further, it is also possible to manage the changed main file A' in the virtual folder VA without affecting the main file A.

[Processing 3. Relation Processing]

Subsequently, the operator drags and drops an arbitrary file stored in an arbitrary folder of the NAS storage N to the virtual folder VA, and migrates or copies the arbitrary file to the virtual folder VA, whereby a read request or a write request of the arbitrary file is issued from the host system 2.

The NAS storage N relates the main file A and the arbitrary file with the reception of the read request and the write request as the trigger.

When the NAS storage N determines that the write request is a write request using the virtual folder VA as the upper level path, it compares the write target data and data in the read target file, but does not perform the actual writing at this stage. When the write target data and data in the read target file coincide as a result of comparing both data, the NAS storage N adds the entry of the real file to the relevant file information 711F of the file relation management table 711 of the main file A in the virtual folder determining that it was able to specify the read target file, and registers the node information of such file. Thereby, the relation of the main file A and the arbitrary file that became the read target file is complete.

Meanwhile, when the NAS storage N determines that the write request is not a write request of data in the virtual folder VA, it copies the arbitrary file into the designated arbitrary folder according to the request issued from the host system 2.

Further, when the write request is a write request to an arbitrary file stored in a separate NAS storage issued from the host system 2 (when the real data and write data do not coincide, or when a read request corresponding to the write request has not been received), the NAS storage N stores the arbitrary file in the virtual object data storage area 95, adds the entry of the file in the virtual object data storage area 95 to the relevant file information 711F of the file relation management table 711, and registers the location information of such data.

The NAS storage N virtually creates a relevant file node to be related with the main file A in the virtual folder VA, and notifies this to the host system 2. Then, similar to the foregoing case, by changing the relevant file name in the virtual folder VA, it is possible to realize the above by changing only the metadata without affecting the substantial relevant file.

Incidentally, relation can also be performed to folders. For example, the folder storing the arbitrary file can be used as the base of the virtual folder VA upon relating the main file A and the arbitrary file. When a folder storing an arbitrary file is used to create a virtual folder VA based on a folder containing "make files" and "project files" to be used, for instance, in a C language or the like, the same folder name can be used by grouping, inside the virtual folder VA, the different volumes and folders or the files stored in different NAS storages N related with the make files. Thereby, since it is possible to group the various files stored in different NAS storages N and uniformly manage such group in an arbitrary base folder, and collectively perform relation without having to individually relate the respective files in the base folder, the operator's burden can be alleviated.

Further, the path name of the virtual folder VA can also be arbitrarily changed. Thereby, when the operator opens an icon of the virtual folder VA arranged in the same hierarchy in the specified folder as before, it will seem as though the operator opened a short-cut to jump to a different folder.

[Processing 4. Metadata Modification Processing]

With the operator's act of deleting the relevant files in the virtual folder VA as the trigger, the NAS storage N changes the "status" of the relevant file information 711F of the deleted relevant file to "deleted" in the file relation management table 711. Then, the NAS storage N deletes (eliminates) the location information (node) of the deleted relevant file in the virtual folder VA, and thereafter reports this to the host system 2.

Here, when the deleted relevant file is a virtual-body file, the data stored in the virtual object data storage area 95 may be deleted immediately to release the area. Further, the NAS storage N may also perform deletion processing after the lapse of an arbitrary (determined) period of time so as to enable subsequent invalidation operation.

[Processing 5. Other Processing]

When the virtual folder VA is to be substantiated in an arbitrary folder other than the specified folder VF, the operator operates "drag and drop" to the icon of the virtual folder in the arbitrary real folder/volume so as to copy and store the file in the virtual folder as a real file in the arbitrary real folder/volume.

Further, by performing drag and drop of the virtual folder VA to a specified folder having a different function, for example, a portability file can be created. Although the details regarding the portability file will be described later, this is a file to be created by the NAS storage N using the configuration information of the virtual folder as its data for the purpose of using the virtual folder VA in another NAS storage N.

As described above, by the operator setting, in addition to the specified folder VF, special function folders such as a portability file creation dedicated folder and a snapshot file creation dedicated folder in the NAS storage N in advance, sophisticated functions can be given to the NAS storage N by performing drag and drop of the virtual folder VA to the special function folder.

Further, when the operator uses backup software or the like and sets the virtual folder VA as the backup target, it is also possible to restore (recover) the virtual folder as a real folder in individual storage apparatuses.

[Others]

Incidentally, the supplementary explanation of routine 1 and routine 2 is provided below.

The operator's operation will become a trigger to operate the NAS storage N. For instance, when files in the virtual folder VA are deleted or real files as the relevant files are deleted, disconnection of the relation is performed. Further, by changing the name of the virtual folder VA itself or the name of files in the virtual folder VA, and changing the name of the relevant files in the real folder, the metadata (file relation management table 711) is changed.

Similarly, when the relation of the real folder and the virtual folder VA is changed, the attribute in the real folder is changed, the attribute in the virtual folder VA is changed, or the path of the virtual folder VA is changed, the metadata (file relation management table 711) is changed.

(1-3-1-3) Example of Relation System based on File Operation in Virtual Folder

Figure 14:
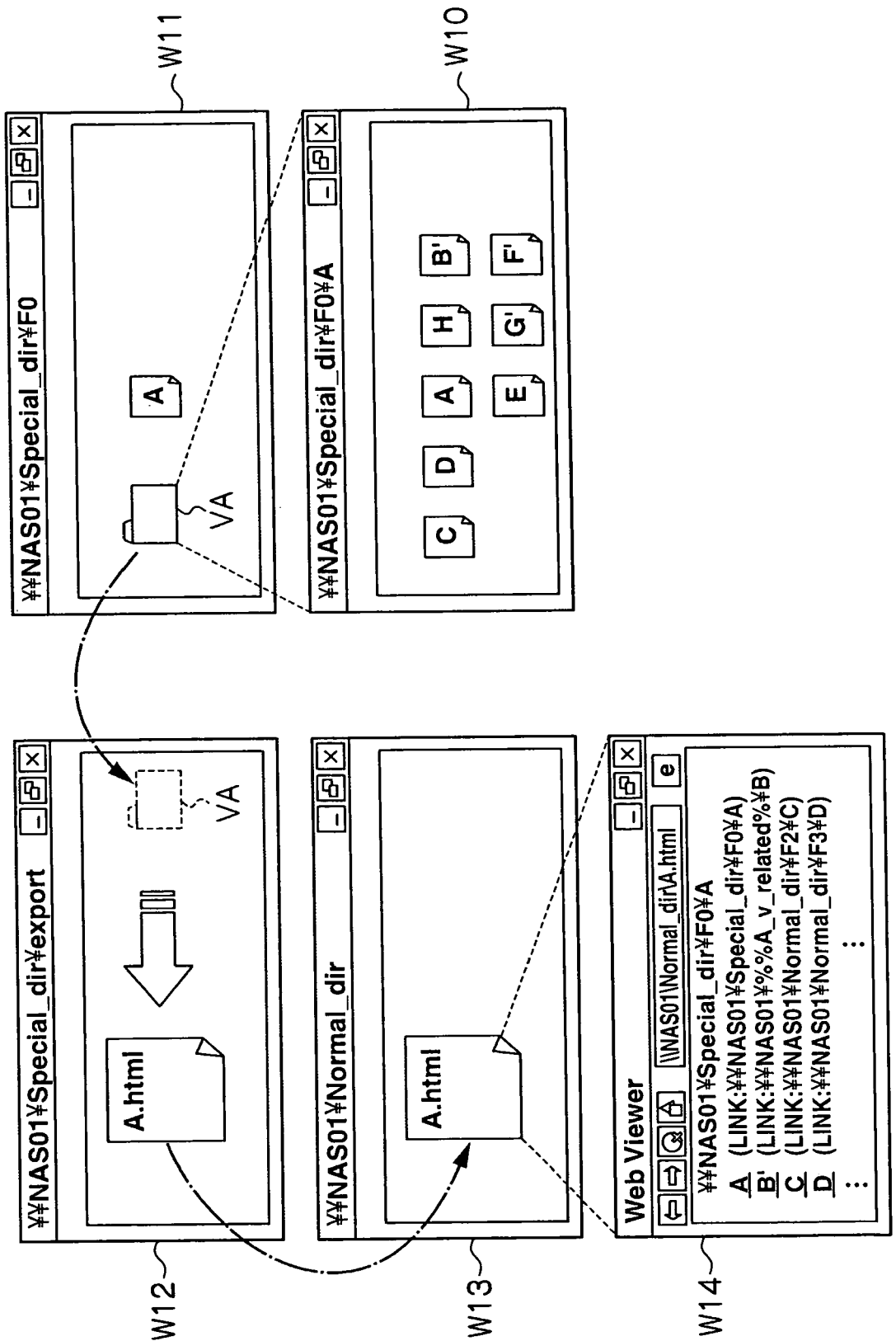
FIG. 14 is a screen diagram of the relation system for operating inside the virtual folder according to an embodiment of the present invention.

FIG. 14 shows a simple example for making the group of files operable with a Web browser accessible from a separate apparatus based on the portability file as an example of the relation method for operating inside the virtual folder VA. As one form of this kind of portability file, there is an HTML file.

[Window W11]

Foremost, the operator opens the window W11 of the specified folder VF containing the virtual folder VA on the screen of the host system 2. Incidentally, the virtual folder VA, as shown in the window W10, includes a file to be related with the main file A. The main file A and the file to be related are virtual-body files or real files.

[Window W12]

Subsequently, the operator drags and drops the virtual folder VA in the window W12 of an export folder as one of the special function folders. Thereby, an HTML file is created in the specified folder VF by the NAS storage N. The export folder will be described later.

[Window W13]

The HTML file in the specified folder VF is migrated to a normal volume 92. This situation is shown in the window W13. Here, the NAS storage N of the file migration destination may also be a different apparatus arranged on the same network.

[Window W14]

The HTML file stored in the normal volume 92 is opened. This situation is shown in the window W14. The HTML file is embedded with a file link enabling the download of such file by clicking the file name displayed on the Web browser. Further, this link destination can also be accessed by the virtual-body file.

Figure 15:
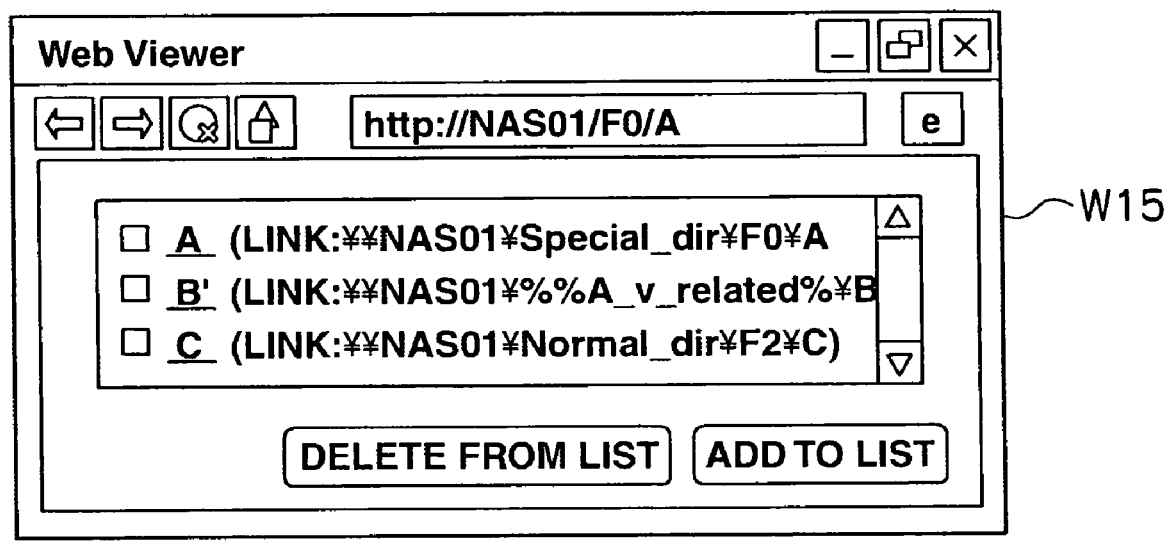
FIG. 15 is a screen diagram on the host system side in a Web server according to an embodiment of the present invention.

Incidentally, the NAS storage N is a storage comprising a function as a Web server. In this case, as shown on the window W15 of FIG. 15, the configuration may be such that the virtual folder VA is directly operable from the Web browser.

(1-4) Conceptual Configuration of Storage System in First Embodiment

The conceptual configuration of the storage system according to the first embodiment is now explained.

Figure 16:
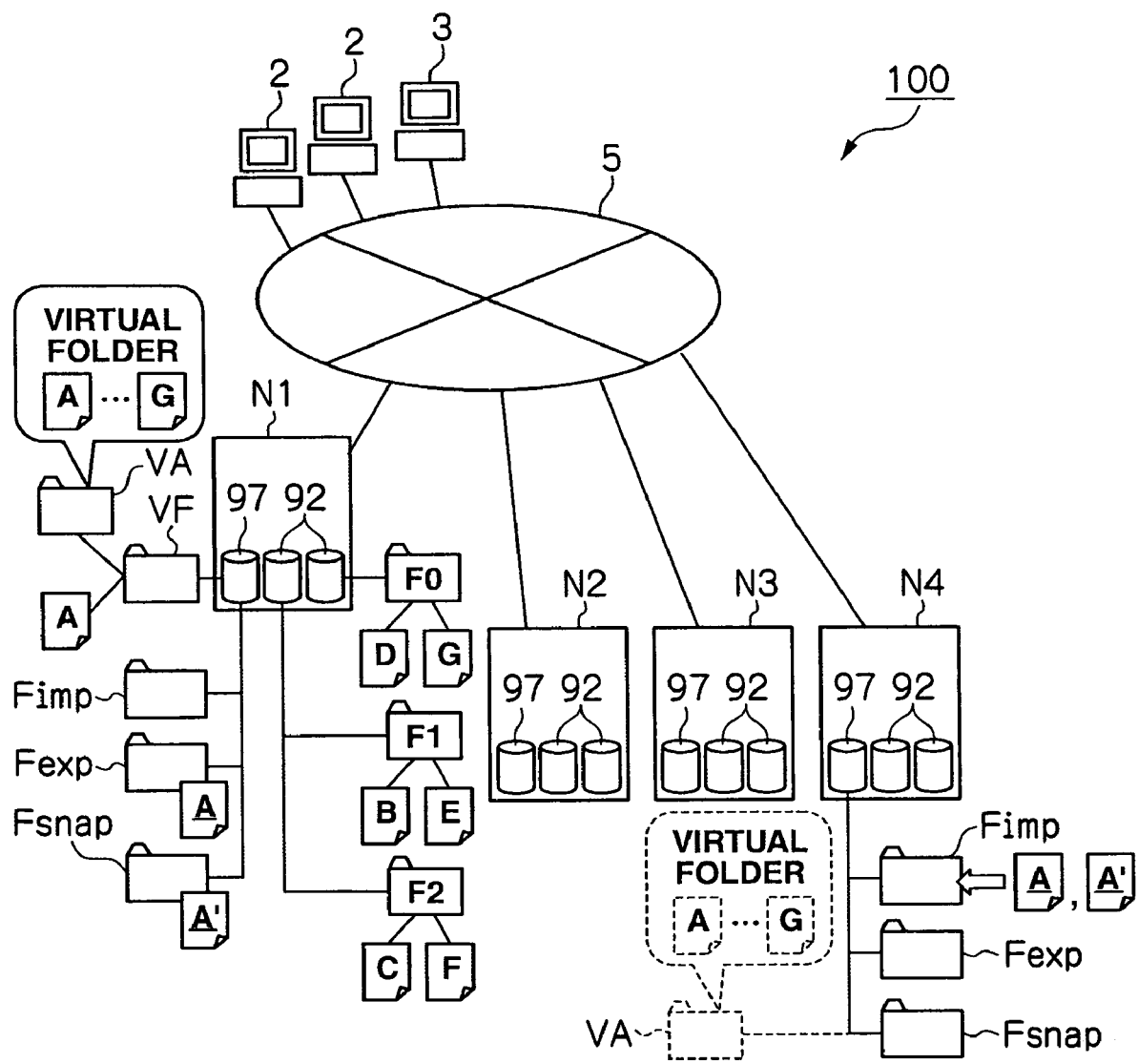
FIG. 16 is a conceptual diagram showing the overall configuration of a storage system according to an embodiment of the present invention.

As shown in FIG. 16, reference numeral 100 represents a conceptual configuration in the case of using the hardware configuration of the storage system 1 explained with reference to FIG. 1.

Incidentally, in FIG. 16, the explanation of figure numbers for components that are the same as those illustrated in FIG. 1 is omitted.

Reference numeral 100 shows a conceptual configuration where the host systems 2 are respectively connected, via the network 5, to the NAS storages N1 to N4 in which the NAS controller 7, the storage controller 8 and the additional chassis 9 configure a single apparatus. Each NAS storage N1 to N4 comprises a plurality of logical volumes 92 to be provided to the storage area of a plurality of SAS hard disks 91. Incidentally, although the NAS storages N1 to N4 are connected to four networks in this example, the number of networks is not limited thereto.

The virtual folder VA is configured from a main file A in the specified folder VF of the NAS storage N1, and the files B to G stored in the folders F0 to F2.

The main file A and the files B to G related with such main file A were created based on the copy and paste operation performed while opening the main file A and the relation operation of files performed from the property window of the main file A explained in routine 1, and the drag and drop operation of files to be related in the virtual folder VA explained in routine 2.

The NAS storages N1 to N4 according to this embodiment have execution folders having three special functions. The functions shown in FIG. 17 are preset in the NAS storages N1 to N4.

Specifically, the import folder Fimp shown with the function folder name "/imp" has a function of importing files stored in the import folder Fimp and is used for reading the portability/snapshot file, and is also set to be executable in response to a specified request from the host system 2.

Here, import processing refers to the processing of creating a virtual folder according to the contents of the portability file. Import processing is performed by the operator dragging and dropping the portability file of the virtual folder VA created from the virtual folder VA to another NAS storage N4 having an import folder Fimp, or by an import request targeting such portability file being issued from the host system 2.

The NAS storage N1 adds the entry of the virtual folder VA information in the storage management table 710 and the file relation management table 711, registers the location information of the file in the virtual folder VA from the portability file, and notifies the virtual node for creating the virtual folder to the host system 2. The read/write request from the host system 2 to the file in the virtual folder VA is transferred by being converted into a read/write request of a real file in the normal volume 92 of the NAS storage N of the source of the portability file or of a virtual-body file in the virtual object data storage area 95 to be related with the file in the virtual folder VA. Further, the read/write request can also be mixed with a request to the virtual-body file in its own virtual object data storage area 95 or to the file stored in a snapshot area at a specified point in time in addition to the NAS storage N of the source of the portability file.

The export folder Fexp shown with the function folder name "/exp" has a function of exporting the virtual folder dragged and dropped in the export folder to the portability file and is used for creating the portability file, and is also set to be executable in response to a specified request from the host system 2.

Here, export processing refers to the processing of writing the contents of metadata and the like, which are required to reproduce the virtual folder VA in a separate NAS storage N, into the portability file. Export processing is performed by the operator dragging and dropping the virtual folder VA in the export folder Fexp of the NAS storage N1, or by an export request being issued from the host system 2. Through the operation of copying the portability file created based on the export processing to the import folder Fimp of another NAS storage N4, it will be possible to use the virtual folder VA that is exactly the same as the NAS storage N1 in the NAS storage N4. Further, the virtual folder VA in the NAS storage N4 can also be customized.

The NAS storage N1 creates a portability file containing the attribute information of the virtual folder VA, and the location information and attribute information of the files in the virtual folder VA in the export folder Fexp in the NAS storage N1. The portability file contains IP address information and security information of the NAS storage N1. Thus, it is desirable that the data of the portability file is encrypted or individually subject to security. Moreover, it is desirable that the export folder Fexp has a function enabling the setting of restrictions on the reliability level of the opponent's NAS storage N and information on the expiration date (retention period) of the portability file, and invalidation of the import processing of the other party by changing the attribute information of the virtual folder VA.

The snapshot folder Fsnap shown with the function folder name "/snap" has a function of writing the contents of metadata and the like required for reconstructing the status of the virtual folder VA in the snapshot folder at the time of snapshot into the snapshot file having portability, and a function of locking on the file for storing old files when the files in the virtual folder are subsequently updated. The snapshot folder Fsnap is used for creating a snapshot file having portability, and is also set to be executable in response to a specified request from the host system 2.

When performing relation using the API of the OS or application of the host system 2 and the virtual folder VA, a plurality of requests and functions are defined in advance as shown in FIG. 18.

Specifically, a request with the function name of "main file definition" is a request for creating an entry in the metadata area, and the user's operation that is equivalent to this request is the copying of files to or creation of new files in the specified folder VF.

A request with the function name of "connection/disconnection" is a request for adding or deleting the file node information to or from the metadata, and the user's operation that is equivalent to this request is dropping of files in the virtual folder VA or deletion of files in the virtual folder VA.

A request with the function name of "metadata control" is a request for changing the relationship of the real file and the (main or relevant) files in the virtual folder, creating a virtual-body file, or changing the metadata of attribute information of the virtual-body file, and the user's operation that is equivalent to this request is changing the name or attribute information of the files in the virtual folder VA.

A request with the function name of "snapshot execution" is a request for creating a snapshot file and adding an entry of metadata, and the user's operation that is equivalent to this request is performing the operation of dropping the virtual folder VA in the snapshot folder Fsnap.

A request with the function name of "virtual folder control" is a request for opening or closing the virtual folder VA and changing the attribute information, and the user's operation that is equivalent to this request is double-clicking the virtual folder VA to open or close the folder, or changing the virtual folder name.

A request with the function name of "real node list report" is a request for simultaneously running a plurality of relevant files or referring to the folder. Although there is no operation of the virtual folder that corresponds to this request, this request is issued from the host system 2 based on the user's button operation of the property window of the main file described above.

A request with the function name of "import/export" is a request for reading/creating the portability file, and the user's operation that is equivalent to this request is performing the operation of dropping the import folder Fimp and the export folder Fexp into the virtual folder VA.

A request with the function name of "security setting" is a request for setting the expiration date of portability or setting an import password, and the user's operation that is equivalent to this request is creating a security file in the virtual folder VA.

(1-5) Relation Operation in First Embodiment

The processing routine, which is a characteristic feature of the present invention, of the host system 2 and the NAS storage N1 for responding to the foregoing requests including the relation operation between the host system 2 and the NAS storage N1 is now explained. Here, although the explanation refers to the operation between the host system 2 and the NAS storage N1, the operation may also be performed between other NAS storages N2 to N4.

Figure 19:
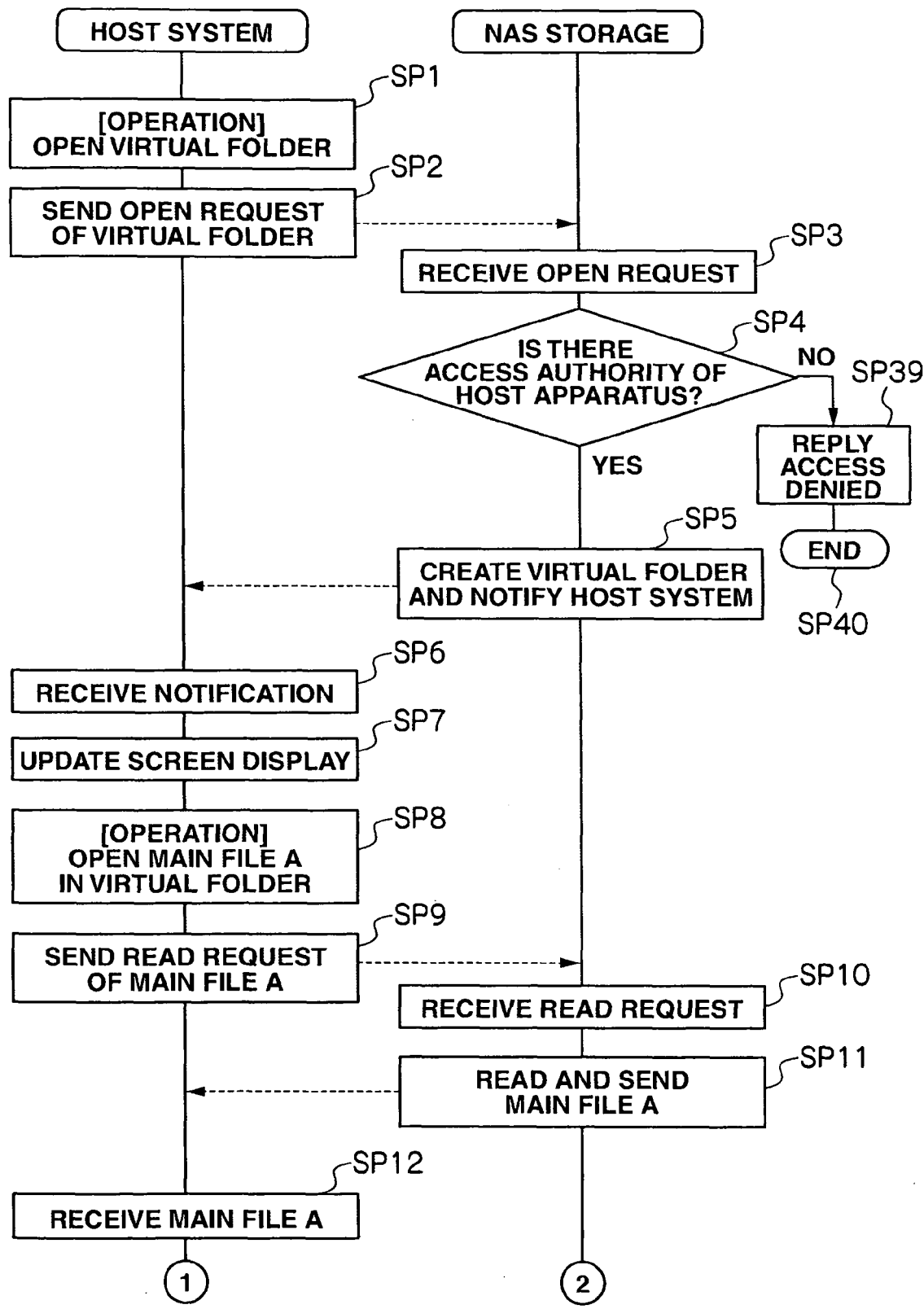
FIG. 19 is a sequence in the operation between the host system and a NAS storage according to an embodiment of the present invention.
Figure 20:
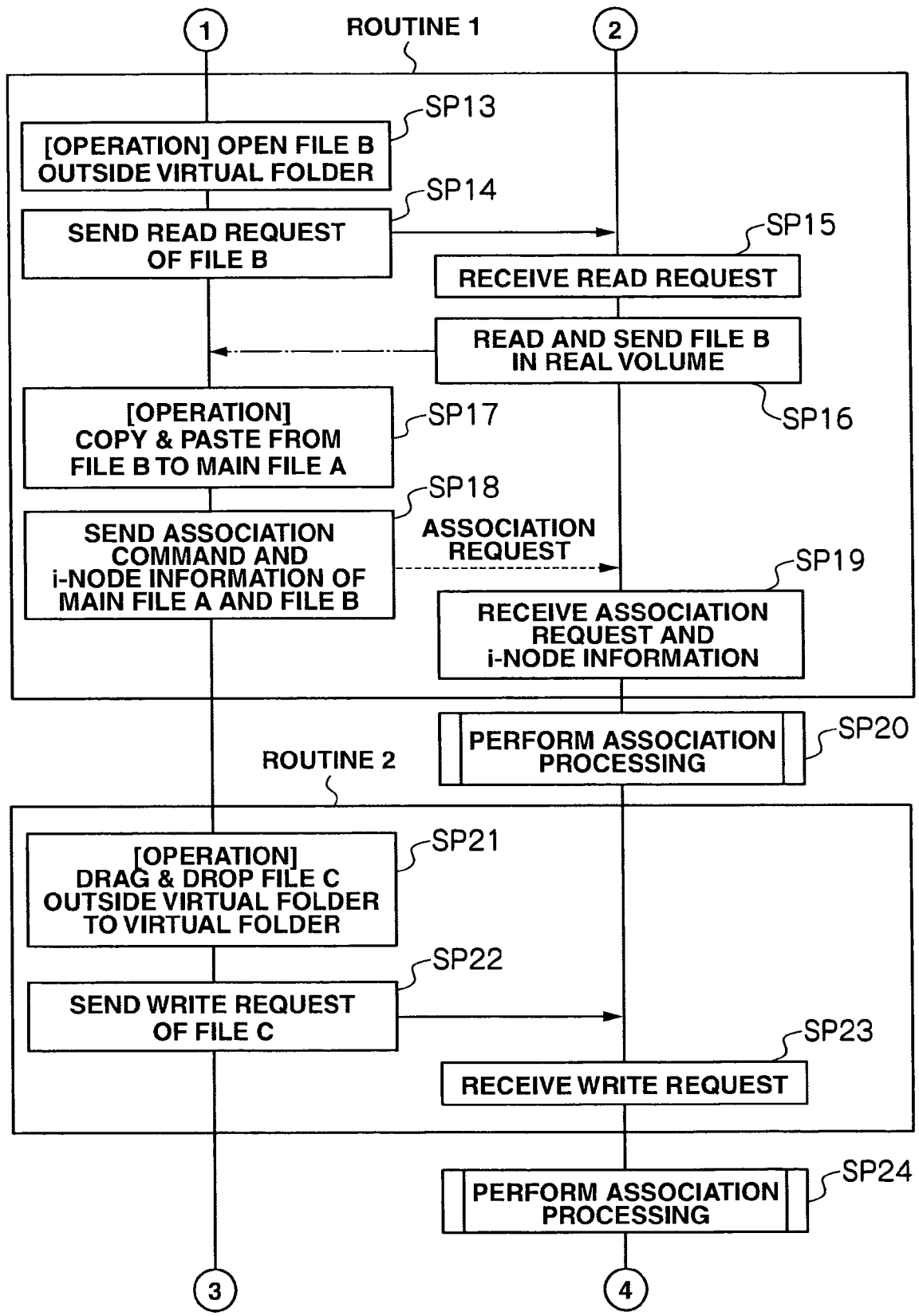
FIG. 20 is a sequence in the operation between the host system and a NAS storage according to an embodiment of the present invention.
Figure 21:
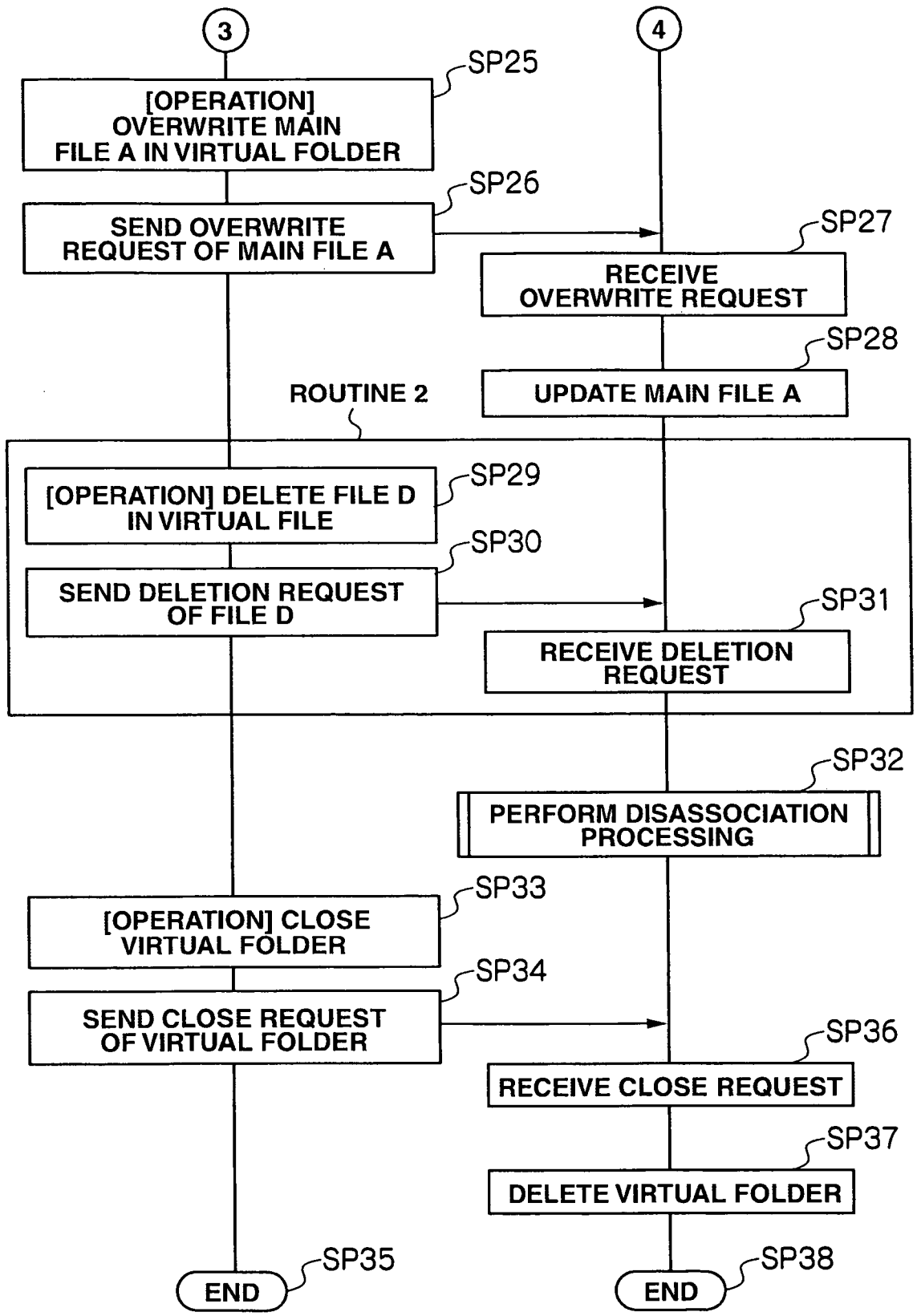
FIG. 21 is a sequence in the operation between the host system and a NAS storage according to an embodiment of the present invention.

Specifically, as shown in FIG. 19 to FIG. 21, foremost, on the side of the host system, the operator performs the operation of opening a virtual folder on the screen of the host system (SP1).

The host system 2 issues an open request to the NAS storage N1 to open the virtual folder (SP2).

The NAS storage N1 receives the open request (SP3). Subsequently, the NAS storage N1 determines whether the access authority of the host system 2 is valid (SP4). When the NAS storage N1 determines that the access authority is valid (SP4: YES), it creates a virtual folder VA and notifies the host system 2 (SP5).

When the host system 2 receives this notice (SP6), it updates the screen display of the host system 2 (SP7).

When the operator performs the operation to open the main file A in the virtual folder VA on the screen of the updated host system 2 (SP8), the host system 2 issues a read request of the main file A to the NAS storage N1 (SP9).

When the NAS storage N1 receives the read request of the main file A (SP10), it searches for the file relation management table 711 and reads the real file A in the real volume 92 related with the main file A in the virtual folder VA, or reads the virtual-body file A in the virtual object data storage area 95 and sends it to the host system 2 (SP11).

The host system 2 receives the main file A read from the NAS storage N1 (SP12). Further, the operator performs the operation for opening the file B that is not stored in the virtual folder VA (SP13).

The host system 2 issues a read request of the file B to the NAS storage N1 (SP14).

When the NAS storage N1 receives a read request (SP15), it reads the real file B in the real volume 92 and sends it to the host system 2 (SP16).

The operator performs the copy and paste operation of copying and pasting the whole or a part of data (information) in the file B to the main file A while the main file A and the file B are opened (SP17).

Then, the host system 2 sends the relation request of the file B as the copy source and the main file A as the copy destination, together with the respective inode information thereof, to the NAS storage N1 (SP18).

When the NAS storage N1 receives the relation request and the respective inode information (SP19), it executes relation connection processing (SP20). Relation connection processing will be described later.

Incidentally, the processing at step SP13 to SP19 is the processing explained in routine 1.

As another operation, the operator performs the drag and drop operation for dragging and dropping the file C, which is not displayed in the virtual folder VA, into the virtual folder VA (SP21). Then, the host system 2 issues a write request of the file C to the NAS storage N1 (SP22).

When the NAS storage N1 receives the write request of the file C (SP23), it executes relation connection processing (SP24). As with step SP20, relation connection processing will be described later.

Incidentally, the processing at step SP21 to SP23 is the processing explained in routine 2.

As another operation, the operator performs the operation for overwriting the file A in the virtual folder VA (SP25). Then, the host system 2 issues an overwrite request of the main file A to the NAS storage N1 (SP26).

When the NAS storage N1 receives the overwrite request of the main file A (SP27), it updates the real file A in the real volume 92 related with the main file A in the virtual folder VA (when feedback to the real file is set), or updates the virtual-body file A in the virtual object data storage area 95 and sends this to the host system (SP28).

As another operation, the operator performs the operation of deleting the file D in the virtual folder VA (SP29). Then, the host system 2 issues a deletion request of the file D to the NAS storage N1 (SP30).

When the NAS storage N1 receives the deletion request of the file D (SP31), it executes relation disconnection processing (SP32). Incidentally, relation disconnection processing will be described later.

Incidentally, the processing at step SP29 to SP31 is the processing explained in routine 2.

As another operation, the operator performs the operation of closing the virtual folder VA (SP33). Then, the host system 2 issues a close request of the virtual folder VA to the NAS storage N1 (SP34), and thereby ends the processing on the side of the host system 2 (SP35).

When the NAS storage N1 receives the close request (SP36), it deletes the virtual folder (node) (SP37), and thereby ends the processing on the side of the NAS storage N1 (SP38).

Returning to step SP4, when the NAS storage N1 determines that the access authority of the host system is invalid (SP4: NO), it replies access denied to the host system 2 (SP39), and thereby ends the processing on the side of the NAS storage N1 (SP40).

Incidentally, for the sake of convenience, although the open/close operation of the virtual folder VA and the operation of the files A to D in FIG. 19 to FIG. 21 were performed continuously, since the various operations independent, the order of performing the operations is not limited to the foregoing order.

(1-6) Relation Connection/Relation Disconnection Processing of NAS Storage

The processing routine, which is a characteristic feature of the present invention, of the NAS storage N1 for performing relation connection processing/relation disconnection processing based on the request from the host system 2 is now explained. This processing is executed by the CPU 70 of the NAS controller 7 of the NAS storage N1 based on the related program 714.

Figure 22:
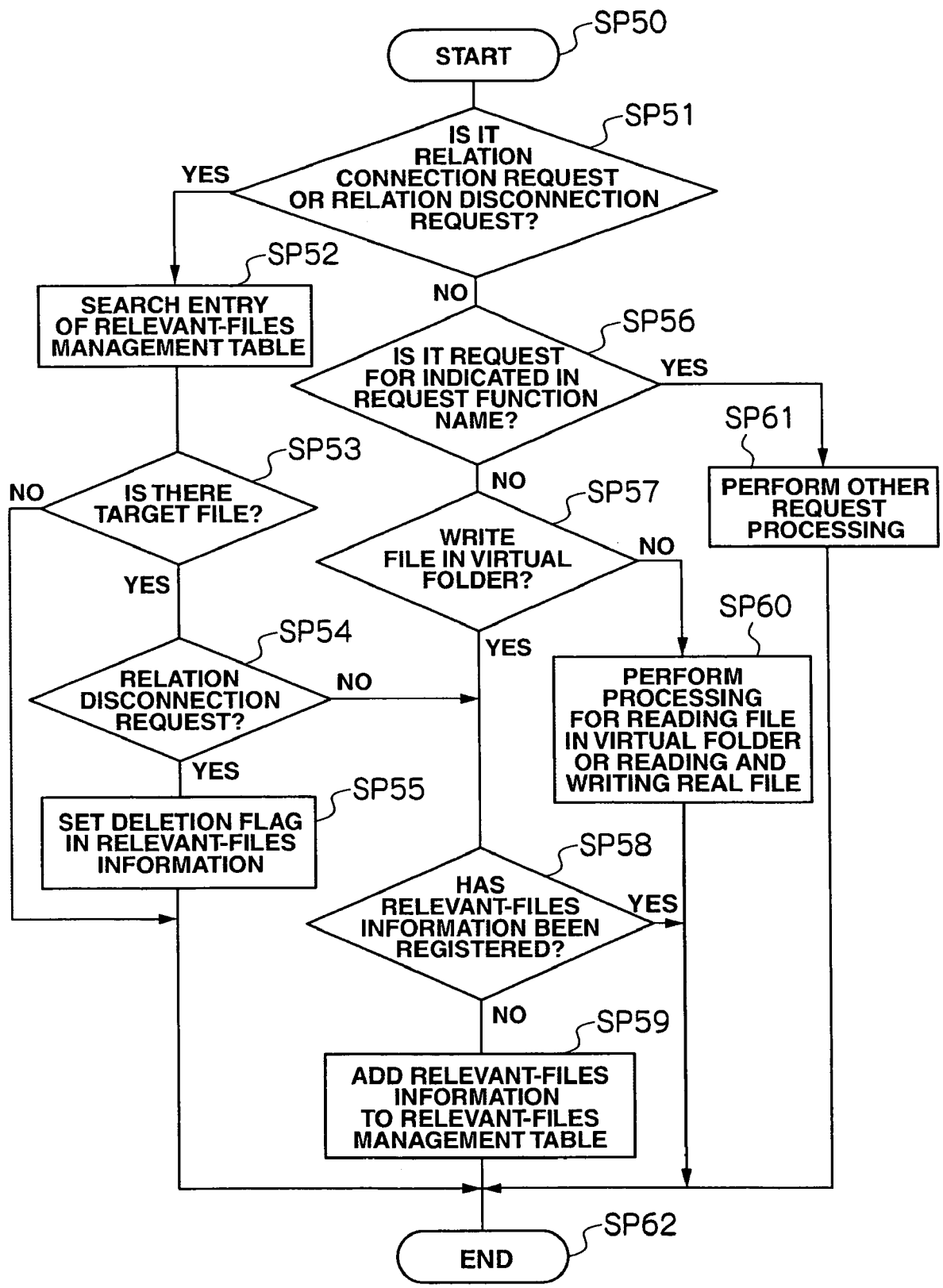
FIG. 22 is a flowchart showing relation connection processing or relation disconnection processing of the NAS storage according to an embodiment of the present invention.

Specifically, as shown in FIG. 22, when the CPU 70 receives a request from the host system 2, it starts the relation connection processing/relation disconnection processing (SP50).

Incidentally, the timing of starting the relation connection processing/relation disconnection processing is the timing that the NAS storage N1 receives a request issued from the host system 2 at steps SP3, SP10, SP15, SP19, SP23, SP27, SP31 and SP36 described in FIG. 19 to FIG. 21.

Subsequently, the CPU 70 determines whether the request from the host system 2 is a relation connection request or a relation disconnection request (SP51). When the CPU determines that the request is either a relation connection request or a relation disconnection request (SP51: YES), it searches for an entry of a file to be related from the file relation management table 711 (SP52).

Then, the CPU 70 determines whether there is a file to be related from the file relation management table 711 (SP53). When the CPU 70 determines that there is a target file (SP53: YES), it determines whether the request from the host system 2 is a relation disconnection request (SP54).

When the CPU 70 determines that the request from the host system 2 is a relation disconnection request (SP54: YES), information of the target file sets a deletion flag in the relevant file information of the file relation management table 711 (SP55), and the CPU 70 thereby ends the relation connection processing/relation disconnection processing (SP62).

Meanwhile, when the CPU 70 determined that there is no file to be related from the file relation management table 711 at step SP53 (SP53: NO), it directly ends the relation connection processing/relation disconnection processing (SP62).

Subsequently, when the CPU 70 determines that the request from the host system 2 is neither a relation connection request nor a relation disconnection request at step SP51 (SP51: NO), it determines whether the request from the host system 2 corresponding to a request listed in the request function name of the chart explained with reference to FIG. 18 (SP56).

When the CPU 70 determines that the request from the host system 2 does not correspond to a request listed in the request function name of the chart explained with reference to FIG.

18 (SP56: NO), it determines whether the request from the host system 2 is a write request to the files in the virtual folder VA (SP57).

When the CPU 70 determines that the request from the host system 2 is a write request to the files in the virtual folder VA (SP57: YES), it determines whether the files in the virtual folder VA have been registered in the relevant file information 711F of the file relation management table 711 (SP58).

When the CPU 70 determines that the files in the virtual folder VA have not yet been registered in the relevant file information 711F of the file relation management table 711 (SP58: NO), it adds the files in the virtual folder VA as the relevant file information 711F to the file relation management table 711 (SP59), and thereby ends the relation connection processing/relation disconnection processing (SP62).

Meanwhile, when the CPU 70 determines that the files in the virtual folder VA have been registered in the relevant file information 711F of the file relation management table 711 (SP58: YES), it thereby ends the relation connection processing/relation disconnection processing (SP62).

When the CPU 70 determines that the request from the host system 2 is not a write request to the files in the virtual folder VA at step SP57 (SP57: NO), it performs read processing (reading of virtual-body files or reading of substantive files of the relevant files) of the files in the virtual folder VA or read or write processing of real files in the normal folder (SP60), and thereby ends the relation connection processing/relation disconnection processing (SP62).

When the CPU 70 determines that the request from the host system 2 corresponds to a request listed in the request function name of the chart explained in FIG. 18 at step SP61 (SP56: YES), it performs the contents and operation corresponding to the request function name illustrated in FIG. 18 (SP61), and thereby ends the relation connection processing/relation disconnection processing (SP62).

(1-7) Snapshot Function

The snapshot processing of the NAS storage N1 using the foregoing snapshot folder Fsnap is now explained.

Snapshot processing is processing for storing the status of the virtual folder VA at a certain point in time, and storing the data of old files in the snap data storage area 96 upon subsequently updating the files. Snapshot processing is performed by the operator performing the drag and drop operation of dragging and dropping the virtual folder VA into the snapshot folder Fsnap, or by a snapshot request targeting the virtual folder being issued from the host system 2.

Snapshot processing creates (reconstructs) the virtual folders VA1, VA2 at an arbitrary point in time from the information of the files currently stored in the virtual folder VAn and the snap data storage area 96. Needless to say, although it is possible to create the virtual folders VA1 to VAn at an arbitrary point in time only from the information of files stored in the snap data storage area 96, current information of the virtual folder VAn is used in consideration of the fact that the security information 10D of the storage management table 710 has been updated.

Figure 23:
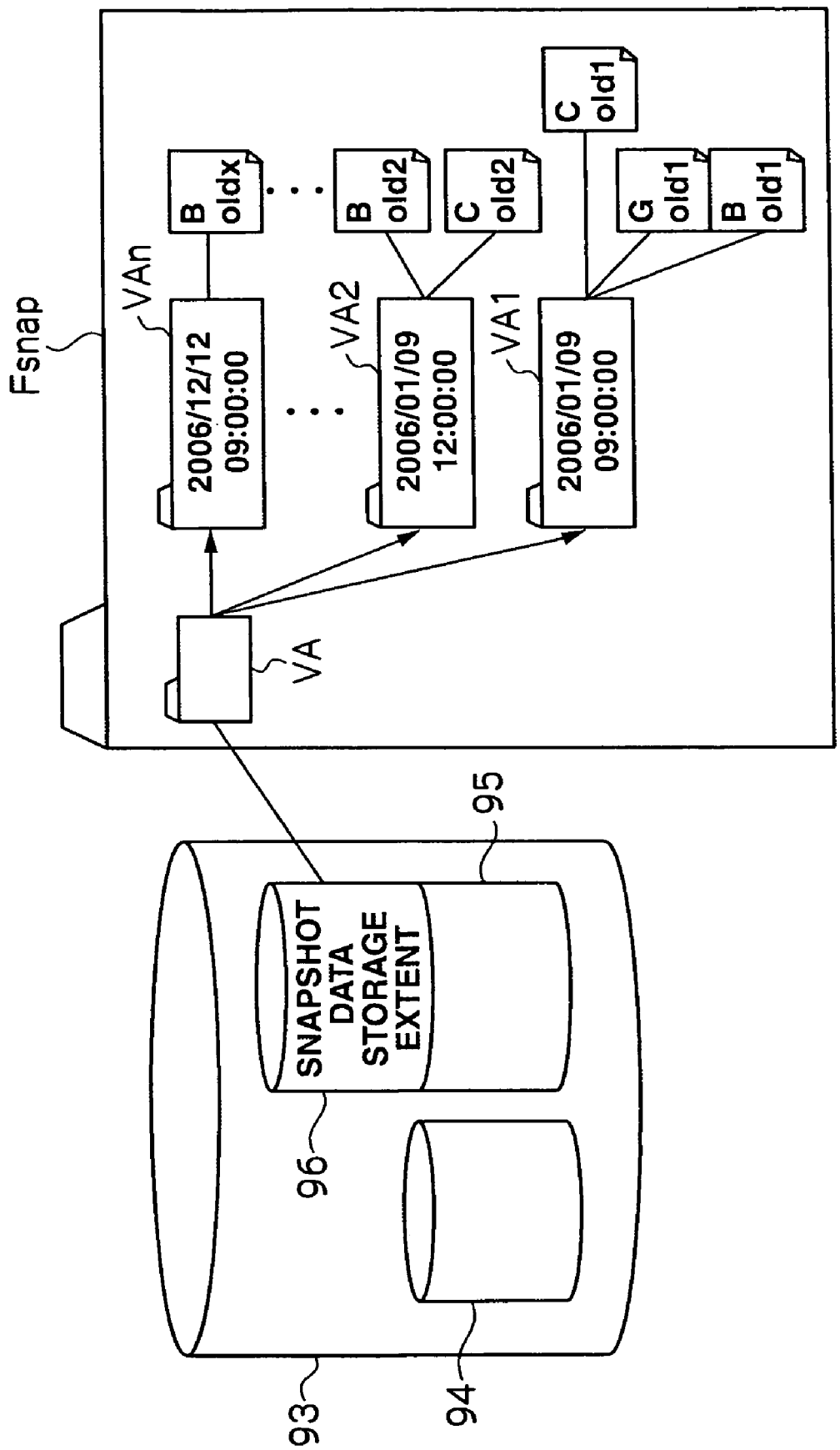
FIG. 23 is a conceptual diagram showing a file to be stored in a snapshot folder according to an embodiment of the present invention.

When snapshot processing is performed in the NAS storage N1, as shown in FIG. 23, entries (hereinafter referred to as virtual history folders) VA1 to VAn of the virtual folder at an arbitrary point in time are created. These entries contain the relation table relating to the main file at that point in time, and the files immediately before the update of the files updated (including the files that were deleted) in the virtual folder VA after the entries were created are stored in the respective virtual history folders (entries). For example, after a snapshot is executed at 09:00:00 on Jan. 9, 2006, the updated original files B, C, G are stored in the virtual snapshot folder VA1. Further, since snapshot processing was performed once again at 12:00:00 on Jan. 9, 2006 and the files B, C were thereafter updated once again, the files B, C immediately before the update are stored in the virtual history folder VA2.

Figure 24:
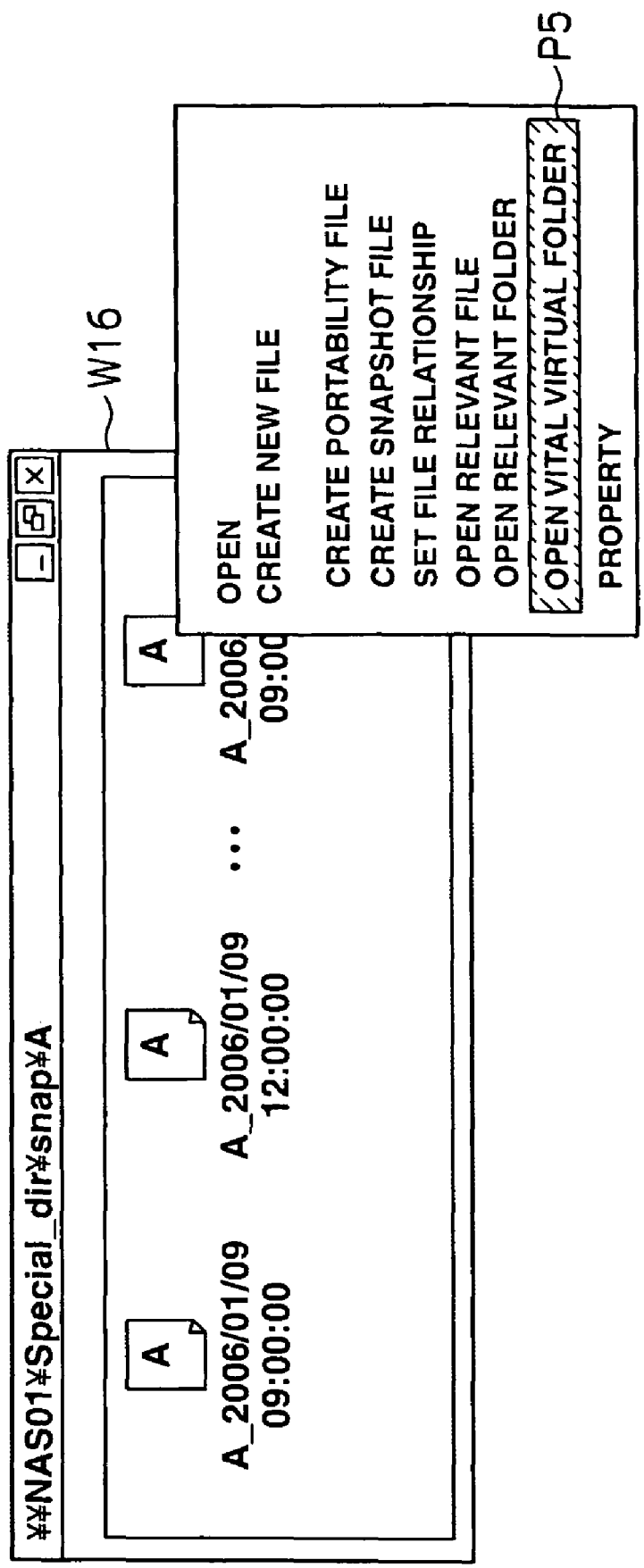
FIG. 24 is a diagram showing an example of a snapshot file in a case of using a snapshot folder according to an embodiment of the present invention.

Further, FIG. 24 shows an example of a snapshot file displayed on the screen when using the snapshot folder Fsnap. A snapshot file of the virtual folders VA1 to VAn at an arbitrary point in time is displayed on the window W16 of the snapshot folder Fsnap. When the operator selects the virtual folder VAm at a certain point in time and executes "open virtual folder" P5 from the short-cut menu, the operator is able to view the relevant file created at the time the snapshot of the selected virtual folder VAm was created.

Figure 25:
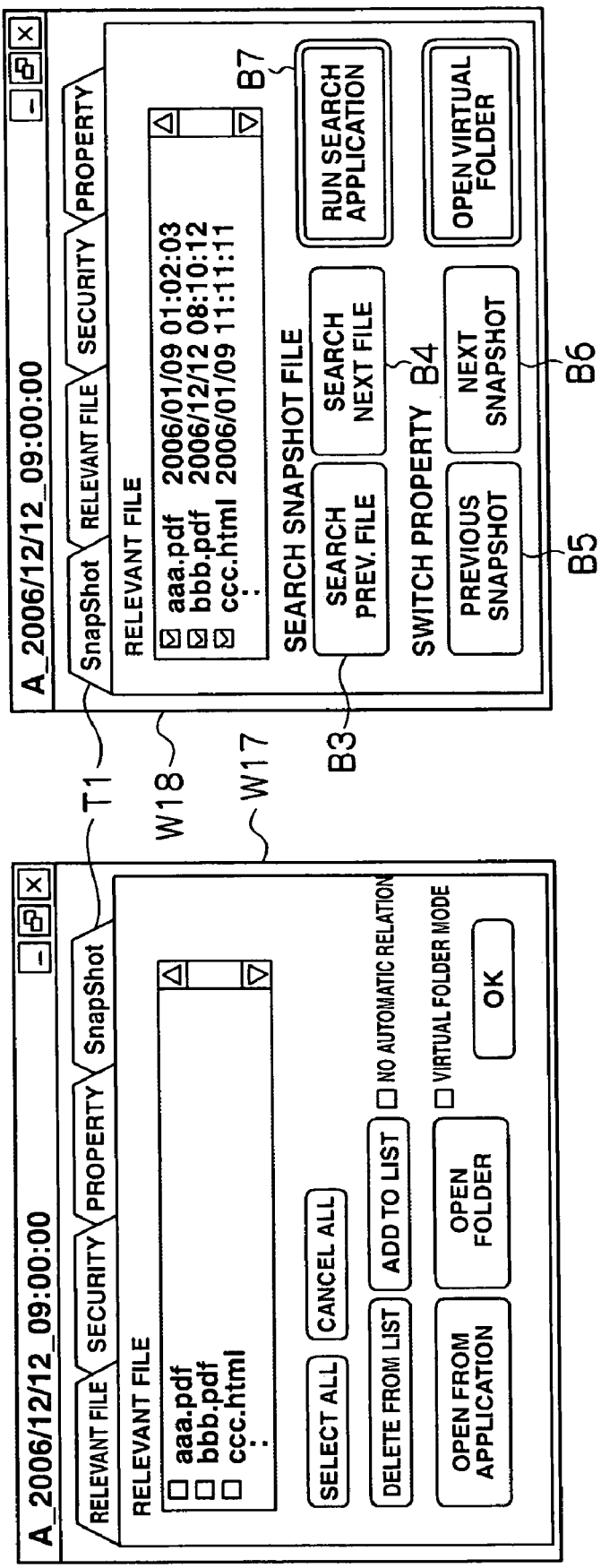
FIG. 25 is a property window of a virtual folder at an arbitrary point in time according to an embodiment of the present invention.

Further, as shown in FIG. 25, a "SnapShot" tag T1 is displayed on the property window W17 of the virtual folder VAm at an arbitrary point in time. On the window W18 in which the "SnapShot" tag T1 is clicked, the link buttons B3, B4 to the snapshot file and the property switch buttons B5, B6 are provided to the historical relevant files including the latest files.

Figure 26:
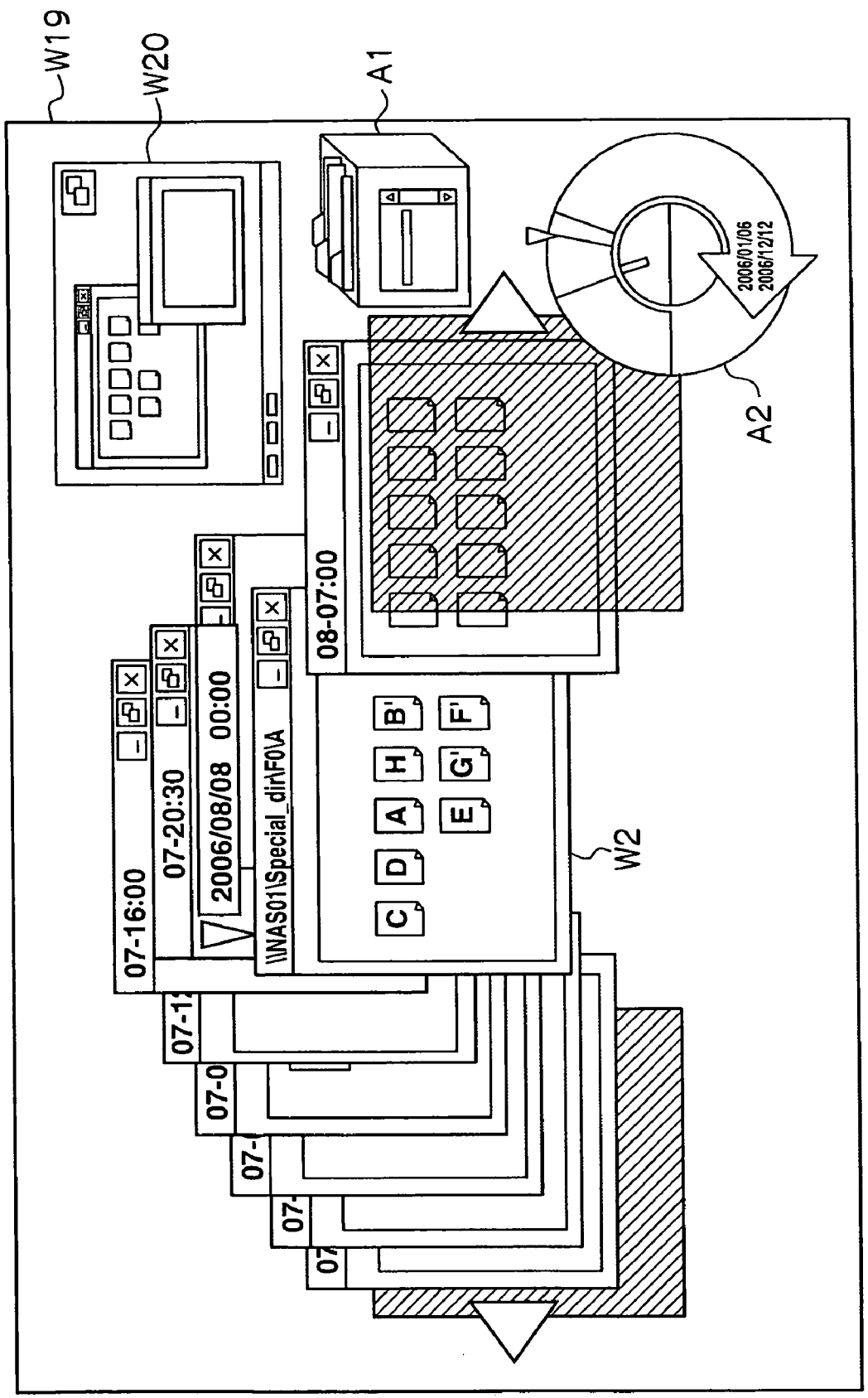
FIG. 26 is a search screen diagram in a host system according to an embodiment of the present invention.

FIG. 26 is a diagram showing an example of the window W19 in the case of selecting the link button B3 to the snapshot files on the "SnapShot" tag T1 window W18 illustrated in FIG. 25, and executing the "run search application" button B7. Here, the main window W20 will be reduced display. Further, the application A1 of the snapshot file search (for virtual folder switching) will become a standby display at the right side of the screen. Further, as a result of using the mouse to control the volume of the application A2 of the snapshot file time search, it is possible to sequentially display the virtual folders within a certain period of time in a plurality of windows on the screen. When the intended window is selected and switched to the main window, the virtual folder will be restored to the status at that point in time.

The window W19 shows a display where the window W21 is focused during the selection of the intended virtual snapshot folder VAm. Further, a plurality of virtual snapshot folders VAxx are displayed on the screen as candidates. Based on the request of the snapshot file time search application A2, the host system 2 issues a switch request to the NAS storage N1 to select the virtual folder VAxx and switch to the snapshot. Then, the NAS storage N1 corrects the contents of the virtual folder VA, notifies the host system 2, and the application visualizes the virtual snapshot folder VAxx at such point in time on a window.

The virtual folder VAm restored based on a snapshot file at an arbitrary point in time of the virtual folder VA in the snapshot folder Fsnap to be switched to the main window is replaced with the current virtual folder VA. Since the virtual folder is just virtually created by the NAS storage N, even if the virtual folder VA is temporarily replaced with the virtual folder VAm, the files configuring the virtual folder VA will not be affected.

(1-8) Effect of First Embodiment

According to the first embodiment, since a plurality of contents arranged in different folders of different file types can be grouped across folders and across volumes, the vexatious complication of administrators and operators concerning management and setting of access authority can be reduced.

Further, according to the first embodiment, it is possible to gather the files to be related with a main file in the virtual folder without affecting the real files merely by registering the main file in a specified folder.

Moreover, if the NAS storage has the foregoing function and can be connected to the same network, it is possible to create the same virtual folder and provide this to the host system side even on different apparatuses without requiring any complicated setting.

(2) Second Embodiment

(2-1) Configuration of Storage System in Second Embodiment

The storage system according to the second embodiment is now explained. In the second embodiment, the components that are the same as the first embodiment are given the same reference numeral. In the explanation of the second embodiment, only the configuration that is different from the first embodiment will be explained.

Figure 27:
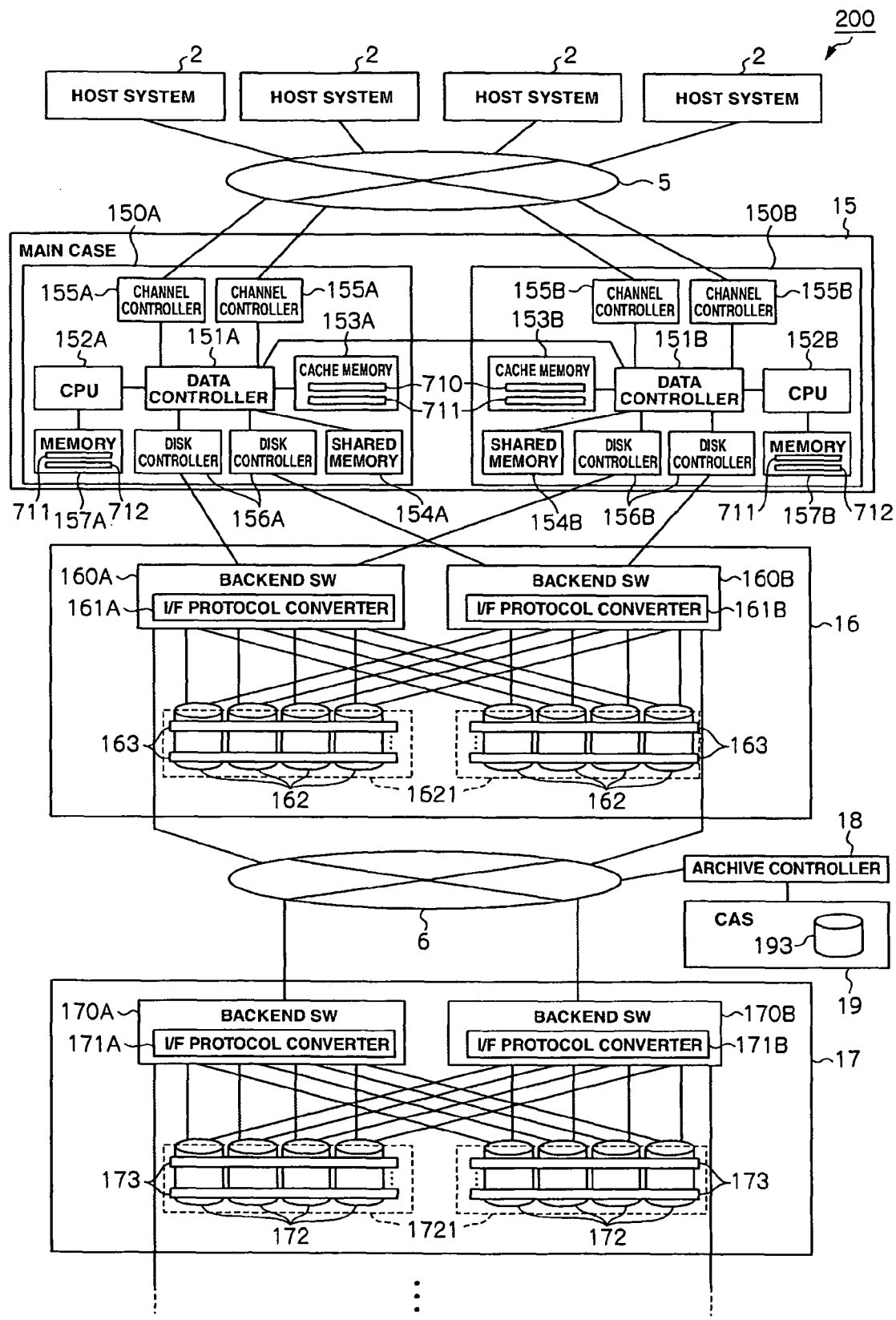
FIG. 27 is a block diagram showing the overall configuration of a storage system according to another embodiment of the present invention.

FIG. 27 shows the overall storage system 200 according to the second embodiment. The storage system 200 is configured by the host system 2 being connected to a storage main chassis 15, which is an integration of the NAS controller 7 and the storage controller 8, via the first network 5, the storage main chassis 15 being connected to a third additional chassis 16, the third additional chassis 16 being connected to a fourth additional chassis 17 and an archive controller 18 via the second network 6, and the archive controller 18 being connected to a CAS (Content Addressed Storage) 19 as the archive storage apparatus.

The storage main chassis 15 is used for controlling the FC hard disk 162 and the SAS hard disk 172 in the third additional chassis 16, and is configured with the controller unit 150 being duplexed.

Other than the configuration of the cache memories 153A, 153B and the memories 157A, 157B in the controller units 150A, 150B, the inside of the controller units 150A, 150B is the same as the respective controller units 80A, 80B in the first embodiment.

Each cache memory 153A, 153B stores the storage management table 710 and the file relation management table 711 explained in the first embodiment. The reason for storing these tables in the cache memories 153A, 153B is because, when there is a main file loaded in the cache, it is expected that the access frequency to their relevant files will increase, and this will enable the high-speed search regarding whether information and data concerning the relevant files are stored in the hard disk of either the FC hard disk 162 or the SAS hard disk 172.

The memories 157A, 157B store the file relation management table 711 and the node information management table 712 explained in the first embodiment. The file relation management table 711 stored in the memories 157A, 157B is not loaded in the cache, and is predicted to have a low access request.

Incidentally, regarding the node information management table 712, it is also possible to normally store it in the FC hard disk 162 and the SAS hard disk 172, and load only the necessary portions in the memories 157A, 157B.

The various tables 710 to 712 are configured the same as the first embodiment, and the explanation thereof is omitted.

Further, as with the first embodiment, the first network 5 is configured from a LAN or a WAN, and the second network 6 is configured from a SAN.

The third additional chassis 16 is an online storage, and comprises duplexed backend switches 160A, 160B (depicted as backend SW in FIG. 27) and the FC hard disk 162.

The backend switch 160 comprises a plurality of ports, and the FC hard disk 162 is connected to each port. The backend switch 160 is a repeater, and has interface protocol converters 161A, 161B (depicted as I/F protocol converter in FIG. 27) for performing interval protocol conversion of the storage main chassis 15 and the FC hard disk drive 162. The backend switch 160 functions as a switching device, and arbitrates and switches the data communication between the storage main chassis 15 and the FC hard disk drive 162.

A plurality of FC hard disks 162 are provided, and these are hard disk drives capable of understanding the requests based on FC protocol. Then, a RAID volume 1621 provided in the storage area of a plurality of FC hard disks 162 is created. In addition, a logical volume corresponding to the allocated storage area (RAID volume 1621) is created as the metadata storage volume 163.

The fourth additional chassis 17 is a nearline storage, and comprises duplexed backend switches 170A, 170B (depicted as backend SW in FIG. 27) and the SAS hard disk 172.

The backend switches 170A, 170B and the interface protocol converters 171A, 171B are configured the same as the third additional chassis 16, and the explanation thereof is omitted. Further, the SAS hard disk 172 and the RAID volume 1721 are configured the same as the SAS hard disk 91 and the RAID volume 911 explained in the first embodiment. In addition, a logical volume corresponding to the allocated storage area (RAID volume 1721) is created in the metadata storage volume 173.

Incidentally, although not shown, the CAS 19 comprises a SATA hard disk and forms the logical volume 193.

(2-2) Snapshot Function

The storage main chassis 15 in this embodiment comprises a tiered storage apparatus (hierarchical storage apparatus) configuration by being equipped with the FC hard disk 162 as a fast and expensive online hard disk and the SAS hard disk 172 with favorable cost performance.

Figure 28:
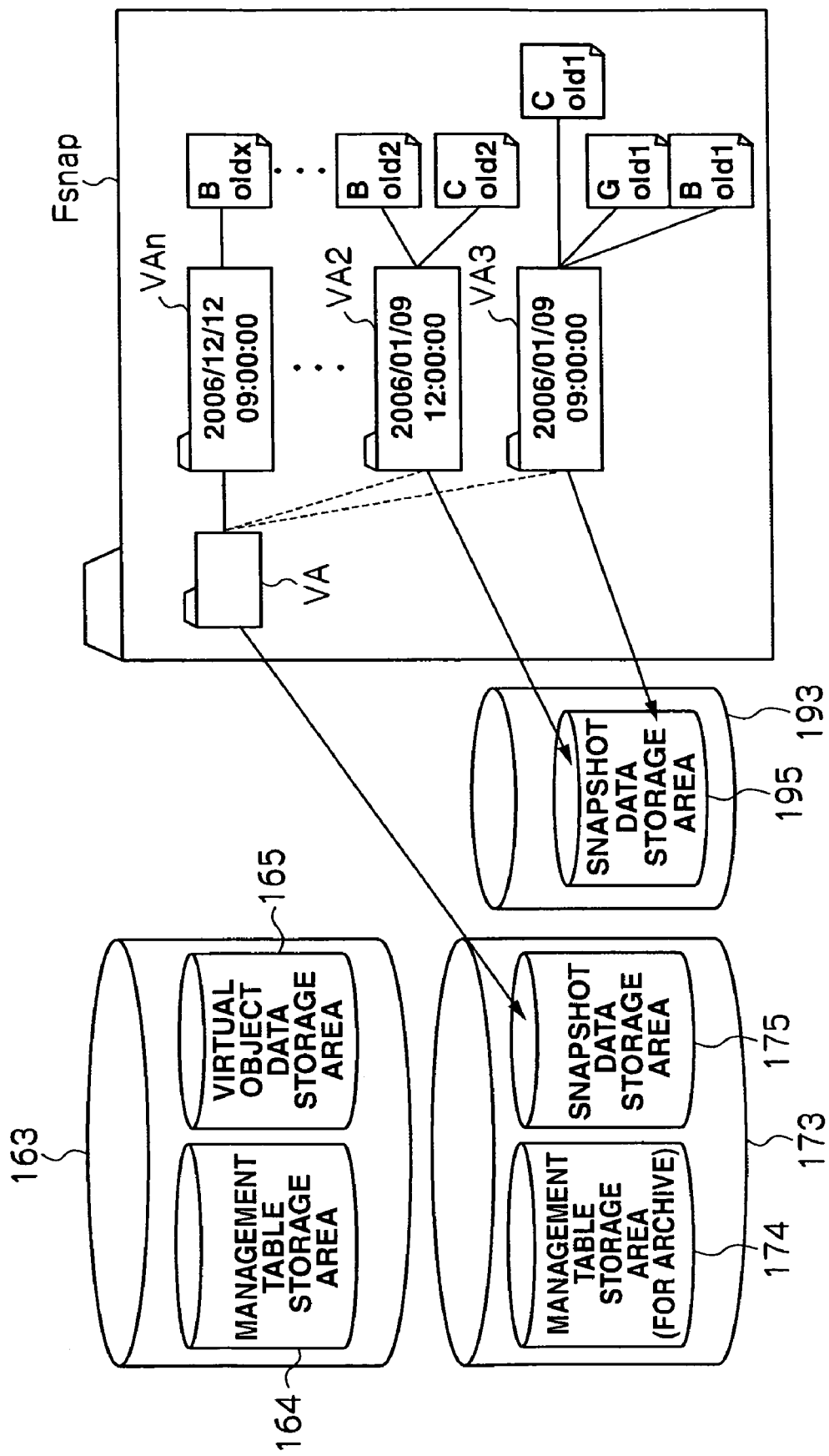
FIG. 28 is a conceptual diagram showing a file to be stored in a snapshot folder according to another embodiment of the present invention.

In this embodiment, as shown in FIG. 28, the management table storage area 164 and the virtual object data storage area 165, and not the snapshot data storage area, are created in the metadata storage volume 163 created in the third additional chassis 16 as the upper level hierarchy, and the management table storage area 174 and the snapshot data storage area 175 for archiving are created in the metadata storage volume 173 as the nearline hard disk space.

Further, the snapshot data storage area 195 is also created in the logical volume 193 as the archive hard disk space.

For instance, the snapshot data storage area 175 of the nearline hard disk space is stored in a folder storing files subject to snapshot processing that was performed relatively recently, and the snapshot data storage area 195 of the archive hard disk space is migrated and stored in a folder storing files subject to snapshot processing that was performed relatively in the past.

Incidentally, it is also possible to migrate and store the files that were deleted in the virtual folder to the nearline hard disk space as the lower level hierarchy.

(2-3) Automatic Snapshot Function

CDP: Continuous Data Protection

The automatic snapshot function can also be realized in the present embodiment.

Specifically, the storage main chassis 15 automatically creates a snapshot at the timing that the files in the virtual folder VA are updated, and ongoingly stores the file history in the virtual folder VA.

Foremost, simultaneously with the creation of metadata during the setting of the main file A, a snapshot of this metadata is created. When the main file A is updated, the old main file A immediately before the update is migrated to and stored in the snapshot data storage area 175 illustrated in FIG. 28. Further, a snapshot is automatically created at the timing of performing this update.

When the snapshot processing of the main file A and the storage of the old main file A in the snapshot data storage area 175 are finished, subsequently, the files that were related with the main file A are also subject to snapshot processing immediately after the relation is performed. When the relevant files are updated, the old relevant files are migrated to and stored in the snapshot data storage area 175. Moreover, a snapshot operation is automatically executed at the timing of performing this update. When a predetermined threshold value beyond a predetermined period of time or a predetermined capacity is exceeded, the old data is further transferred from the snapshot data storage area 175 to the archive controller 18, and archive processing for storing this in the snapshot data storage area 195 is performed.

Similarly, even when the real files of the relevant files are updated, the old real files immediately before the update are stored in the snapshot data storage area 175.

When the old real files immediately before the update are stored in the snapshot data storage area 175, the controller 150 executes snapshot processing to the virtual folder VA once again.

By repeating the snapshot processing and the archive processing as described above, the update history of the virtual folder VA will be ongoingly stocked in the snapshot data storage areas 175, 195.

(2-4) Effect of Second Embodiment

According to the second embodiment, since a plurality of contents arranged in different folders of different file types can be grouped across folders and across volumes, the vexatious complication of administrators and operators concerning management and setting of access authority can be reduced.

Further, according to the second embodiment, by storing folders storing files of a low access frequency in a storage area of a lower level hierarchy, it is possible to configure a storage system at a lower cost than the storage system explained in first embodiment. Moreover, the storage system according to the second embodiment comprises a robust data protection function based on the CDP function. Since this CDP function enables the storage of difference files of virtual folder units in comparison to conventional difference storage methods of various volume units, it is possible to considerably reduce the storage capacity required for the CDP.

(3) Third Embodiment

(3-1) Conceptual Configuration of Storage System in Third Embodiment

The conceptual configuration of a storage system 300 according to the third embodiment is now explained. In the storage system according to the third embodiment, the conceptual configuration uses a plurality of NAS storages explained in the first embodiment. Incidentally, the components that are the same as the first embodiment are given the same reference numeral.

Figure 29:
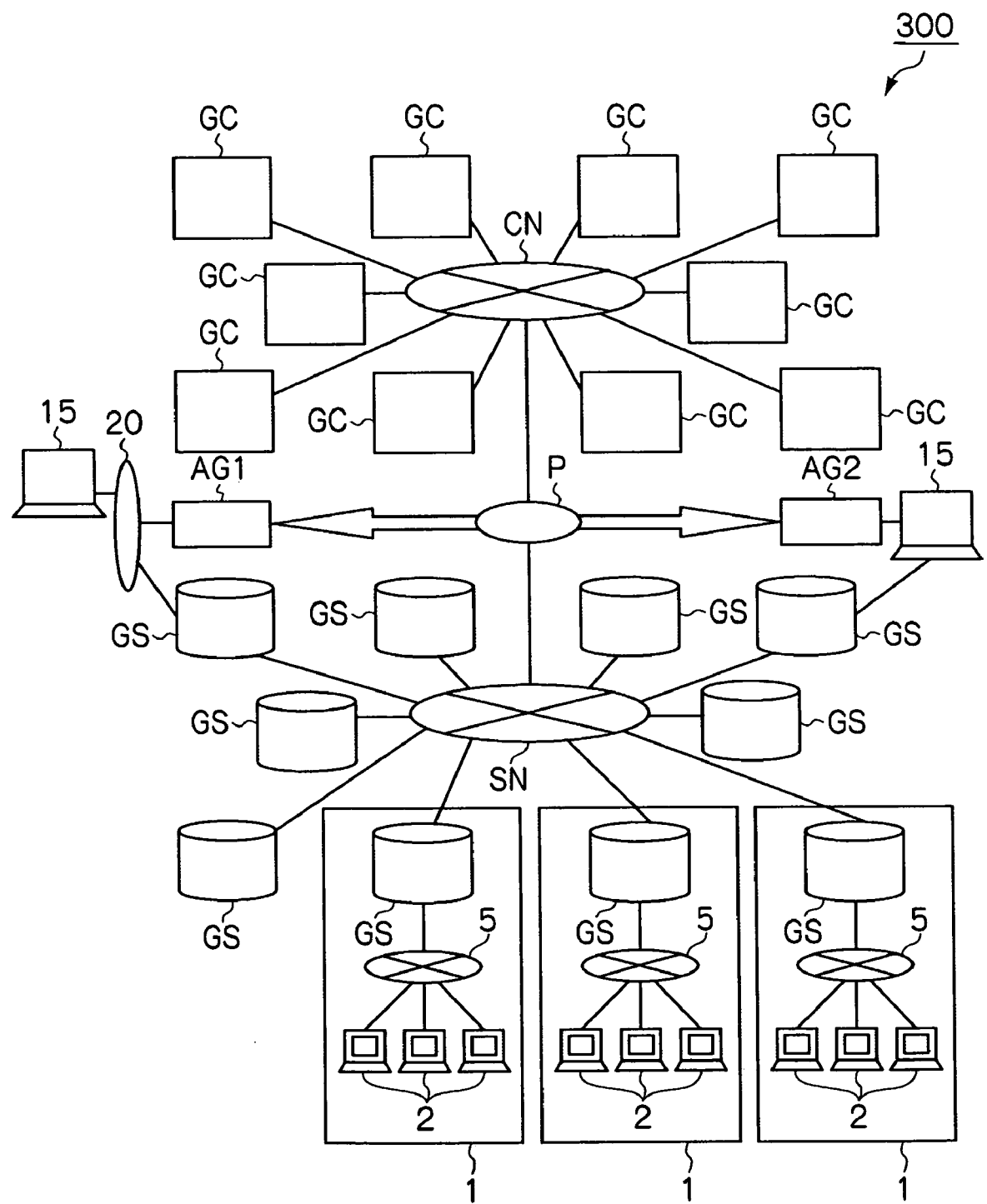
FIG. 29 is a conceptual diagram showing the overall configuration of a storage system according to yet another embodiment of the present invention.

Specifically, FIG. 29 shows the storage system 300 according to the present embodiment. The conceptual configuration of the storage system of this embodiment will be explained by dividing it into the respective blocks.

The storage system 300 according to this embodiment has a conceptual configuration where three storage system 1, in which the storage system 1 explained in first embodiment configures one group, and a plurality of grid storages GS are connected via a storage network SN, a plurality of grid computers GC are connected via a computer network CN, the storage network SN and the computer network CN are connected via a path cluster P, and the path cluster P is connected to an operator terminal unit 15 via a plurality of arbiter gateways AG1, AG2, . . . .

Incidentally, the arbiter gateway AG1 may also be connected to the operator terminal unit 15 via the network 20, or be directly connected to the operator terminal unit 15 without going through a network.

Incidentally, it is desirable to make the network path between the storage network SN and the computer network CN an optimal path by controlling the path cluster P in terms of path load balancing.

Further, it is also possible to equip the arbiter gateway AG with a file system and a virtualization function including exclusive access control and dispose it between the storage network SN and the computer network CN. Here, the grid storage may be configured as a block access-type storage apparatus instead of a file access-type NAS storage. Nevertheless, since the arbiter gateway AG will be burdened with a heavy load, it is desirable to alleviate the load by clustering it and distributing the path.

Figure 30:
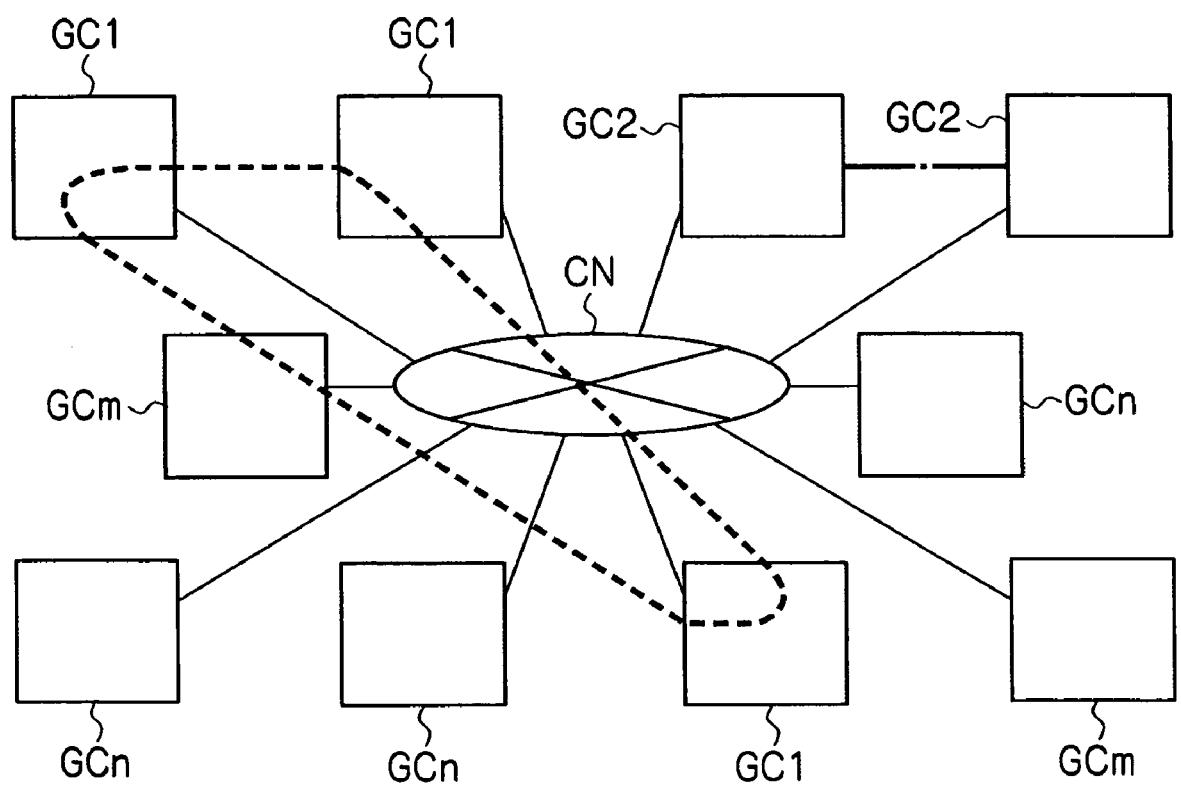
FIG. 30 is a conceptual diagram showing the partial configuration of a storage system according to yet another embodiment of the present invention.

The grid computer group shown in FIG. 30 virtually creates a high-performance computer by connecting/linking a plurality of grid computers GC1 to GCn via the computer network CN, and is used by the operator to extract computer resources such as the necessary processing performance or storage capacity from the virtually created high-performance computer. In the plurality of grid computers GC1 to GCn, there are cases where the types of jobs to be processed in each grid computer are different, and cases where the types of jobs are the same. For instance, as shown in FIG. 30, when the reference numerals of the grid computers GC1 to GCn are the same number, this represents a grid computer that processes the same job group in parallel.

Figure 31:
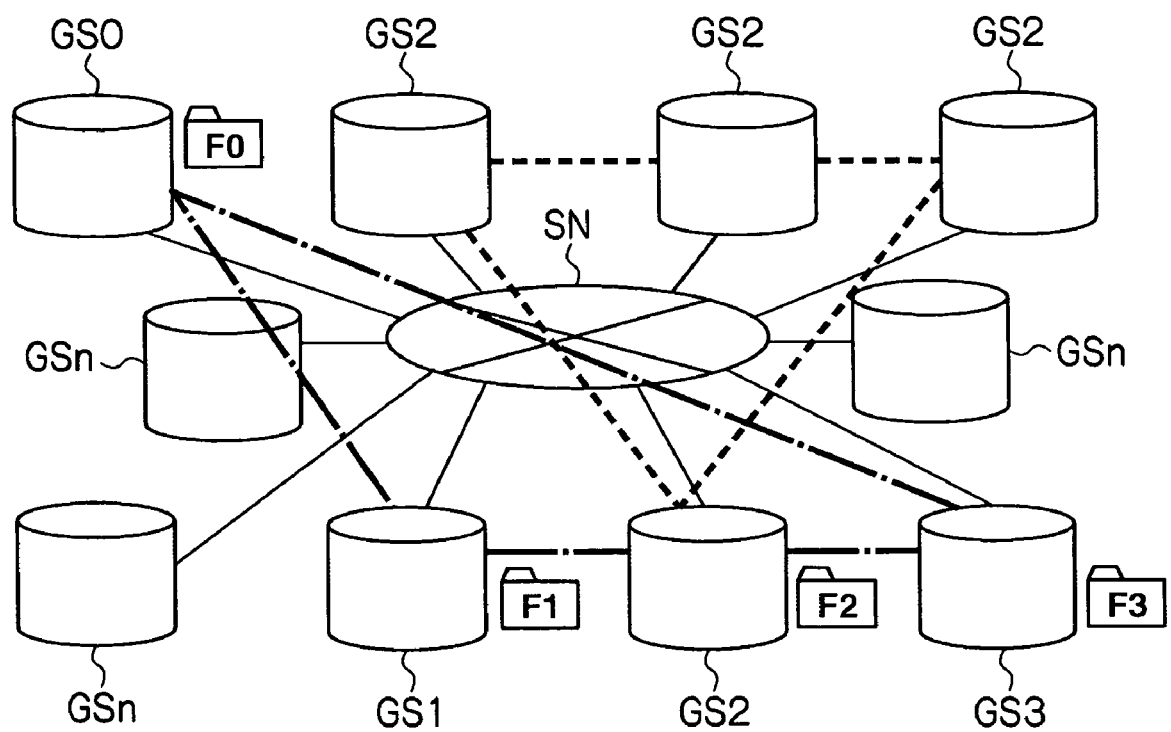
FIG. 31 is a conceptual diagram showing the partial configuration of a storage system according to yet another embodiment of the present invention.

The grid storage group shown in FIG. 31 is realized by connecting a plurality of grid storages GS0 to GSn via the storage network SN, and is configured so that the hardware is able to prevent the load from being concentrated on a specified NAS storage N. In this embodiment, the arbitrary grid storage GS0 stores the folder F0. Incidentally, based on the types of jobs to be executed by the grid computer, the plurality of grid storages GS1 to GSn may have different storage characteristics such as the performance sought in the respective grid storages and cost per capacity, or have different storage resources such as the capacity, number of physical ports and necessary bandwidth.

Figure 32:
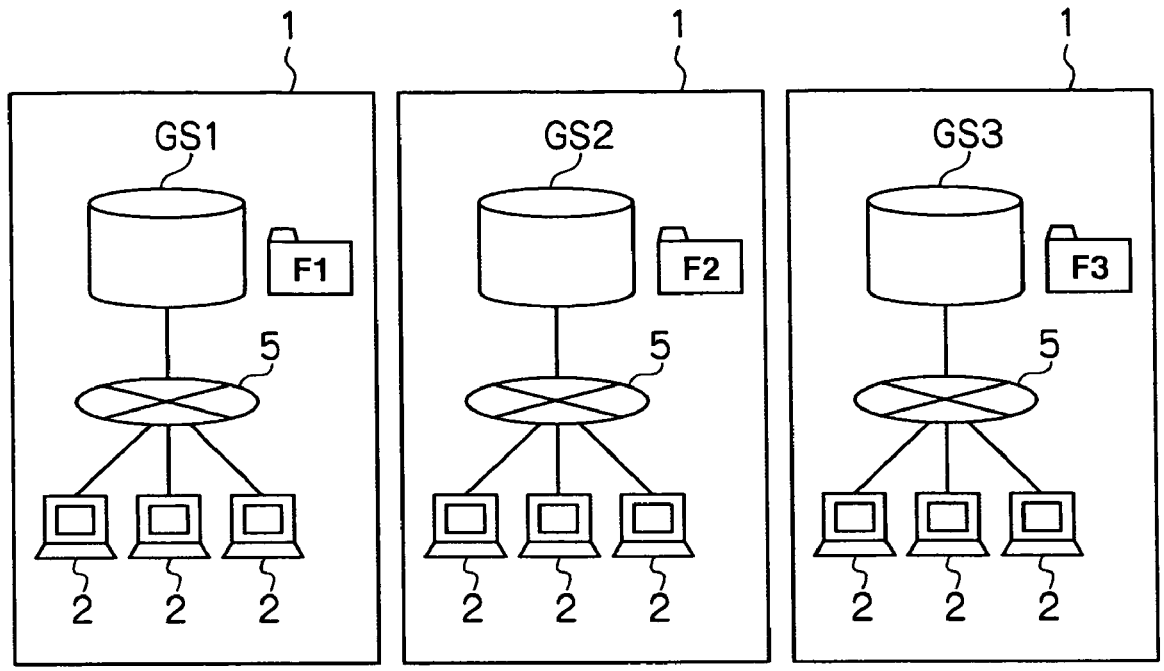
FIG. 32 is a conceptual diagram showing the partial configuration of a storage system according to yet another embodiment of the present invention.

FIG. 32 shows three storage systems 1. Each of the grid storages GS1 to GS3 in the storage system 1 stores the respective folders F1 to F3. Further, the grid storages GS1 to GS3 are the plurality of NAS storages N explained in the first embodiment.

Figure 33:
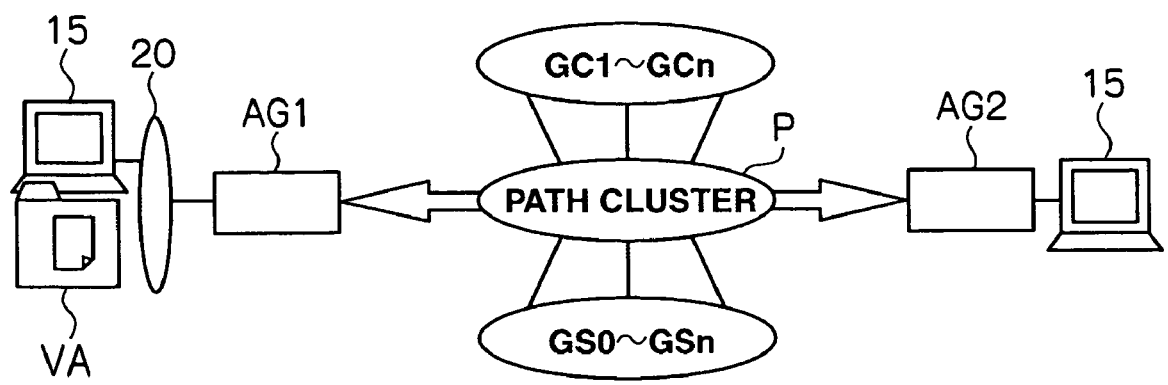
FIG. 33 is a conceptual diagram showing the partial configuration of a storage system according to yet another embodiment of the present invention.

As shown in FIG. 33, the arbiter gateways AG1, AG2 are apparatuses for arbitrating the resource and schedule of the grid computer GC and the grid storage GS. The arbiter gateways AG1, AG2 monitor the resource of the NAS storage N, calculate the schedule according to a job request, and control the allocation of the respective resources of the necessary computer and storage.

For instance, when a job from the operator is requested to the arbiter gateway AG1, the arbiter gateway AG1 refers to the common database in order to secure the required resource, and updates the common database (schedule reservation) according to the result calculated based on the available resource and required time. The update of the common database is notified to the other arbiter gateway AG2, and the schedule adjustment is managed in an integrated manner.

Thereafter, the arbiter gateway AG1 calculates (estimates) the required occupancy time and optimal distribution of the acquired resources from the job priority and the like, and transfers the respective jobs to the respective grid computers GCxx to GCyy after adjustment. Nevertheless, in addition to one grid computer GCxm to GCxn handling one job, a plurality of grid computers GCxm to GCxn may also handle one job, and, depending on the type of job, one grid computer GCm may execute/perform a plurality of jobs.

Here, as a part of the parameter information for transferring the job to each resource, a virtual folder VA imported to a part or the whole of the grid storages GSm to GSn allocated with a portability file required for processing is provided from the grid storage group via the arbiter gateway AG1.

Here, the arbiter gateway AG1 performs control and resource management so that the portability file is imported preferentially to the NAS storage N with a greater resource. The NAS storage N that received the import command creates the virtual folder VA. Thereafter, the arbiter gateway AG1 sets the jobs given to the respective grid computers GCxx to GCyy to active.

Figure 34:
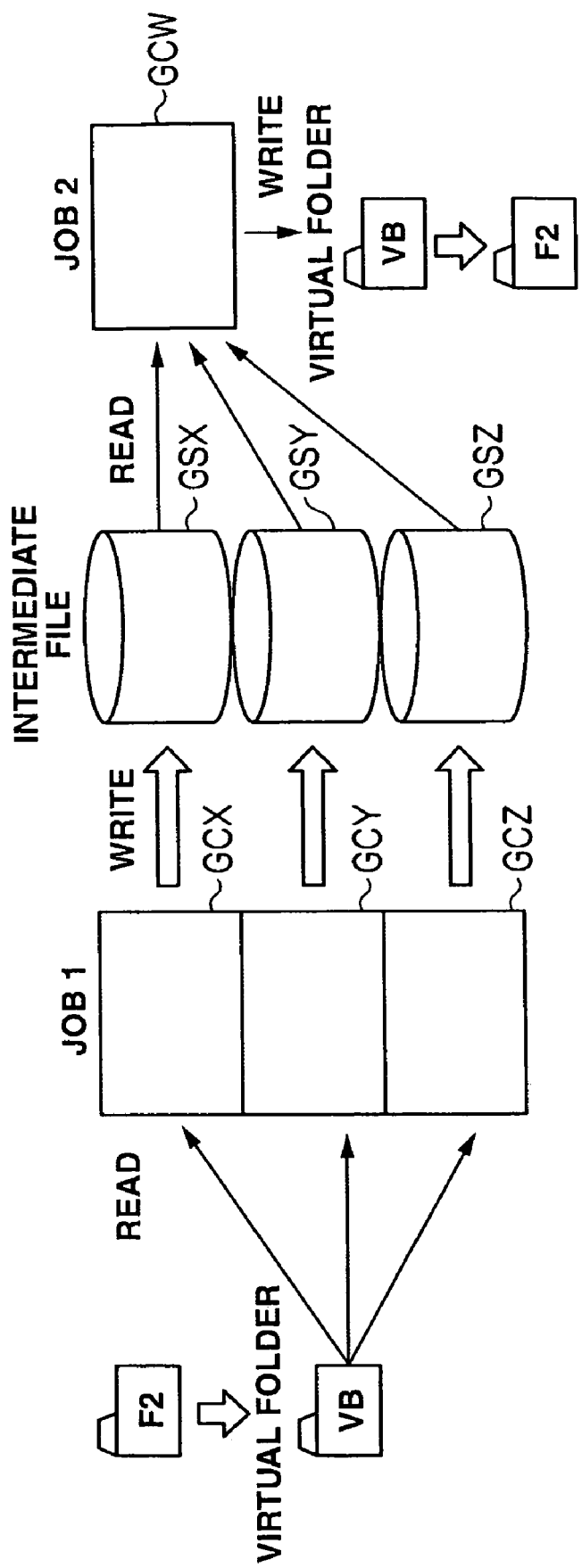
FIG. 34 is a conceptual diagram showing the operation of a conventional storage system according to yet another embodiment of the present invention.

FIG. 34 is a diagram explaining a mode similar to a conventional operation when the operator is to write data from the operator terminal unit 15 into the folder F2.

Foremost, the operator uses the operator terminal unit 15 to request the arbiter gateway AG1 to acquire the resource required in executing the intended job and perform scheduling. Here, delivered from the operator side to the arbiter gateway AG1 are various types of information such as the termination time desired or allowable by the operator, a job list and type and quantity of resource to be allocated to each job, and standard system load information for each job.

The arbiter gateway AG1 that received the request accesses the common database storing the resource operational status and schedule information of the storage system 300 provided internally or externally, and extracts/selects and reserves the resource required for the request from the current operational status and the like. Selection is controlled so that those with a currently low operational load are allocated preferentially. If it is not possible (enough) to acquire the operator's desired resource due to requests from other operators or the like, processing is performed to distribute scheduling so as to allocate the coefficient corresponding to the processing time of the insufficient resource to the jobs, and to reserve in advance the resource with a job scheduled to be finished soon.

When the scheduling of the resource reservation is complete, the arbiter gateway AG1 issues a reservation complete notice to the operator terminal unit 15. The reservation complete notice includes the identifier or type of resource that was acquired, and the estimated duration required for the processing to finish.

When it is not possible to acquire the required resource and the processing time will exceed the standard time, it is desirable that the operator terminal unit 15 notify the operator informing the details of such information to enable the cancellation of the subsequent processing, and issuing a message urging the operator to confirm whether the processing should be continued.

When there is no problem in the reservation complete notice from the arbiter gateway AG1 or upon receiving a command to continue the processing from the operator, the operator terminal unit 15 sends a job 1 and a job 2 as the respective job programs and portability information for forming a virtual folder VB. Incidentally, the portability information in this embodiment is not limited to a file.

The arbiter gateway AG1 distributes the job 1 and job 2 as the respective job programs received from the operator terminal unit 15 to each of the secured grid computers GCW to GCZ. In FIG. 34, the grid computers GCX to GCZ are allocated to the job 1, and the grid computer GCW is allocated to the job 2. Further, the arbiter gateway AG1 sends portability information and an import request to the grid storages GSX to GSZ. Incidentally, the foregoing operation can also be realized by writing the portability file of the virtual folder VB in the import folder Fimp of the grid storages GSX to GSZ as shown in the first embodiment.

The grid storages GSX to GSZ that received the import request, based on a similar routine as the one explained in the first embodiment, creates a virtual folder VB for storing the folder F2 (including the file groups in the folder) as the folder to be used by the job 1 in the NAS storage N configuring the respective grid storages GS, and provides this to the grid computers GCW to GCZ.

The arbiter gateway AG1 recognizes that the virtual folder VB is providable based on the import completion report, and makes the job 1 in the grid computers GCX to GCZ an active state. Thereby, the processing of the job 1 in the grid computers GCX to GCZ is started. Incidentally, the job 2 in the grid computer GCW remains in a standby state. This is because the processing of the job 2 requires the processing result of the job 1. The processing performance of the grid computer GCW while the job 2 is in a standby mode can be provided to the jobs of other operators. Further, the processing of the job 2 does not have to be performed by the grid computer GCW, and may be scheduled to be executed by any one of the grid computers GCX to GCZ after the job 1.

Operation of the job 1 is to read data from a file to become the source stored in the virtual folder VB, and write the intermediate file in each of the grid storages GSX to GSZ. Reading of the file to become the source is adjusted in coordination among the grid computers GCX to GCZ executing the same job 1. Further, the read request of the file to become the source stored in the virtual folder VB is transferred from the grid storages GSX to GSZ to the grid storage GS2 having the real folder F2 of the virtual folder VB, and the data of the file read from the grid storage GS2 is sent to each of the grid computers GCX to GCZ of the request source via the grid storages GSX to GSZ.

The intermediate files based on the job 1 processed respectively by the grid computers GCX to GCZ are independently created in each of the grid storages GSX to GSZ. Like this, although there is no load alleviation effect during the reading of the file to become the source since processing is performed on the same grid storage GS2, processing is distributed to the grid storages GSX to GSZ during the writing of files. The script defined in the job 1 does not need to indicate the physical location of the source file, and merely needs to designate the virtual folder VB in the associated grid storage GS.

When the job 1 is finished, each grid computers GCX to GCZ sends a job completion notice to the arbiter gateway AG1. When all jobs 1 are complete, the arbiter gateway AG1 sets the job 2 in a standby state in the grid computer GCW to active. The job 2, through communication with the job 1, recognizes the location of the intermediate files created with each job 1, processes each of the intermediate files as a source, and stores the resulting file in the virtual folder VB. The virtual folder VB designated at this time may use any one of the grid storages GSX to GSZ, or use a storage that is newly imported and created in one of the grid storages GS. Further, processing for closing the virtual folder VB in the unused grid storages GSX to GSZ may also be performed. After the job 1 reports the location of the intermediate files to the job 2, it returns itself to a standby status, and notifies the arbiter gateway AG1 of the completion of processing. The arbiter gateway AG1 that received this notice updates the common database, and notifies the other arbiter gateways AG that the relevant resource is available again.

The job 2 writes data in a file in the real folder F2 via the virtual folder VB. When all processing is finished, it closes the virtual folder VB that it used, returns itself to a standby state, and notifies the arbiter gateway AG1 of the completion of processing. The arbiter gateway AG1 that received this notice notifies the operator terminal unit 15 that all processing is finished, and releases all resources that were provided to the operator. The arbiter gateway AG1 then updates the common database, and notifies the other arbiter gateways AG that the relevant resource is available again.

Figure 35:
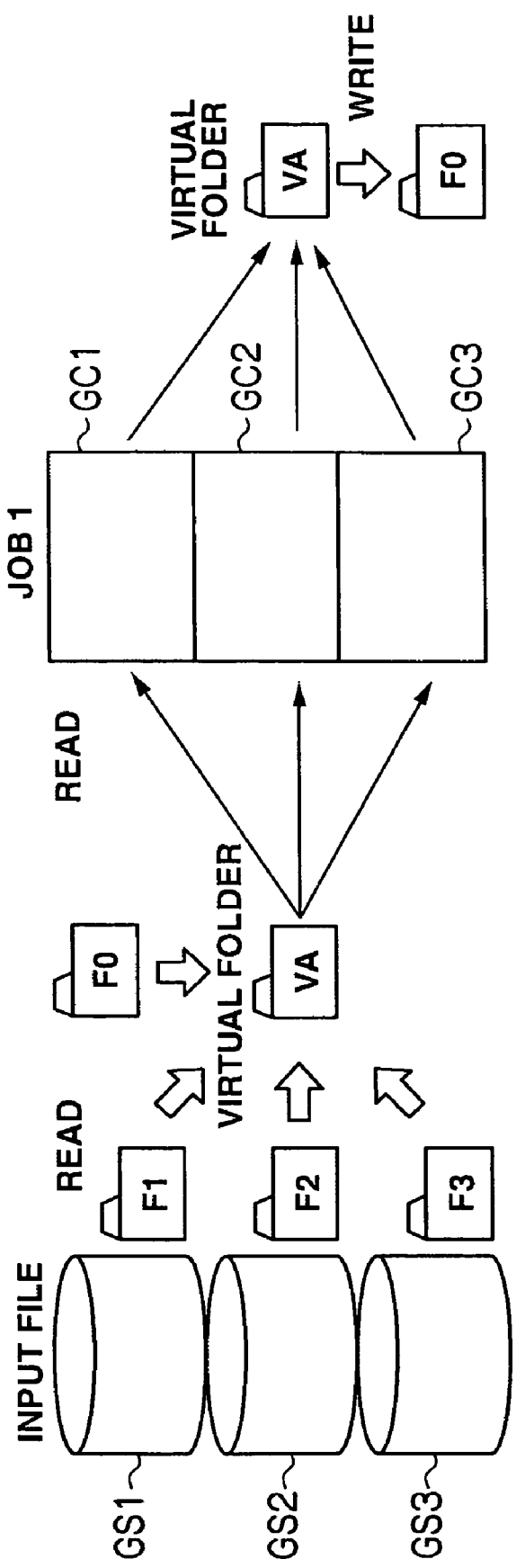
FIG. 35 is a conceptual diagram showing the operation of a storage system according to yet another embodiment of the present invention.

Meanwhile, as shown in FIG. 35, the operation of this embodiment where the operator writes data from the operator terminal unit 15 into the folder F0 based on load balancing processing of a different job 1 is now explained. Incidentally, this operation may be performed by the operator using the arbiter gateway AG1 from the operator terminal unit 15, or performed by another operator using another arbiter gateway AG (for instance, AG2) from the operator terminal unit 15. This processing and the processing illustrated in FIG. 34 may also be performed simultaneously. In this embodiment, a case is explained where the arbiter gateway AG1 is used subsequent to the processing described above.

The arbiter gateway AG1, as the job 1, imports portability information enabling the reconstruction of the virtual folder VA created from the grid storage GS0 as the arbitrary worker grid storage, and the grid storages GS1 to GS3 having a real file and a real folder to respectively become sources into the grid storage GS0. The real folders F1 to F3 provided by these grid storages GS1 to GS3 correspond to the respective common folders F1 to F3 to be used by each independent client group (for instance, an autonomous division of a company) as shown in FIG. 32. The import means and commands of the operator terminal unit 15 have been described above, and the explanation thereof is omitted.

The job 1 reads a plurality of source files from the virtual folder VA containing the real folder F1 to F3 to which the source file belongs, performs parallel processing in each of the grid computers GC1 to GC3, and writes the data, which is the collaborative processing result, into the output file of the virtual folder VA. The substance of this output file is created in the folder F0 of the grid storage GS0 as the worker grid storage.

When the processing of the job 1 is finished, each grid computer GC1 to GC3 sends a job complete notice to the arbiter gateway AG1. When all jobs 1 are complete, the arbiter gateway AG1 notifies the operator terminal unit 15 that all processing is complete, but does not release the resource on the grid storage side at this point in time, and only releases the resource on the grid computer side, updates the common database, and notifies the other arbiter gateways AG that the relevant resource is available again.

The operator confirms that the processing is finished by viewing the screen of the operator terminal unit 15, accesses the virtual folder VA commanded by the arbiter gateway AG1, and obtains the intended output file. After the operator stores the output file into a storage that it is managing via copying or migration, the operator operates the operator terminal unit 15 and commands the arbiter gateway AG1 to close the virtual folder VA. The arbiter gateway AG1 that received the command releases the reserved resource on the side of the grid storage, updates the common database once again, and notifies the other arbiter gateways AG that the relevant resource is available again.

As described above, according to the operation of this embodiment, since the worker grid storage GS0 is selected from the grid storage GS with a low load, it is possible to balance the write load from the grid computer GC.

Incidentally, as another operation of this embodiment, it is possible to designate two NAS storages N from the host system 2 and issue an export command to one NAS storage N and issue an import command to the other NAS storage N so as to send and receive metadata as portability information between the NAS storages N, whereby the virtual folder VA can be reconstructed in the other NAS storage N.

(3-2) Effect of Third Embodiment

According to the third embodiment, since a plurality of contents arranged in different folders of different file types can be grouped across folders and across volumes, the vexatious complication of administrators and operators concerning management and setting of access authority can be reduced.

Further, according to the third embodiment, since a grid storage with a low load is selected by the arbiter gateway, it is possible to balance the write load from the grid computer or the host system to the grid storage or the NAS storage based on the command from the operator terminal unit.

(4) Other Embodiments

Although the NAS storage N as the storage controller created a folder configuration unit in a logical volume in order to store a plurality of files and the file to become the core was specified and managed as a main file based on the core-contents management unit, the folder configuration unit and the core-contents management unit may also be created in individual hardware.

Although the group folder configuration unit created the virtual folder and the files in the virtual folder were related with the real files actually stored in the folder, it is also possible to form a substantive folder with the group folder configuration unit without forming a virtual folder.

Although the related contents management unit was provided in the NAS storage N, and the management information of the main file and the relevant files were managed by storing the storage management table 710, the file relation management table 711 and the node information management table 712, the management unit may be created in individual hardware.

Although a logical volume provided to the lower hierarchy in the NAS storage was used as the nearline volume, a logical volume provided to the upper hierarchy may also be used.

The present invention can be broadly applied to a storage system having one or more NAS storages, or storage system of various other modes.

What is claimed is:
1. A storage system having one or more storage controllers for forming a plurality of logical volumes in a storage area of a physical device for storing a plurality of contents provided from a host system, wherein said one or more storage controllers comprise:

a nearline volume for storing contents among said plurality of logical volumes with a low access count from said host system, wherein said nearline volume comprises a snapshot folder for storing, as needed, information of said group folder at an arbitrary point in time;

wherein information concerning said group folder with a low access frequency from said host system is preferentially selected and stored among information of a plurality of said group folders stored in said snapshot folder;

a folder configuration unit for configuring a plurality of folders to store said plurality of contents in said plurality of logical volumes;

a core-contents management unit for specifying and managing core-contents to become the core from said plurality of contents to be stored in said plurality of logical volumes or said plurality of folders;

a related contents management unit for managing said core-contents and one or more related contents associated with a part or the whole of said core-contents from a plurality of contents to be stored in said plurality of logical volumes or said plurality of folders; and a group folder configuration unit for configuring a group folder that groups said core-contents and said related contents across said plurality of logical volumes or said plurality of folders.

2. The storage system according to claim 1, wherein said group folder configuration unit forms a virtual folder for performing grouping; and wherein said core-contents and said related contents arranged in said virtual folder are associated with a plurality of contents to be stored in said plurality of folders created with said folder configuration unit, or said plurality of logical volumes.

3. The storage system according to claim 1, wherein, when said related contents management unit changes the management information managing the association of said core-contents and said related contents, the association of said related contents stored in said group folder is changed.

4. The storage system according to claim 1, wherein said plurality of contents are a plurality of files; and wherein said core-contents management unit specifies and manages a core file by searching said core file based on the contents information sent from said host system.

5. A management method of a storage system having one or more storage controllers for forming a plurality of logical volumes in a storage area of a physical device for storing a plurality of contents provided from a host system, wherein said one or more storage controllers perform:

a nearline volume for storing contents among said plurality of logical volumes with a low access count from said host system, wherein said nearline volume comprises a snapshot folder for storing, as needed, information of said group folder at an arbitrary point in time;

wherein information concerning said group folder with a low access frequency from said host system is preferentially selected and stored among information of a plurality of said group folders stored in said snapshot folder;

a folder creation step for forming a plurality of folders to store said plurality of contents in said plurality of logical volumes;

a core-contents management step for specifying and managing core-contents to become the core from said plurality of contents to be stored in said plurality of logical volumes or said plurality of folders;

a related contents management step for managing said core-contents and one or more related contents associated with a part or the whole of said core-contents from a plurality of contents to be stored in said plurality of logical volumes or said plurality of folders; and a group folder configuration step for configuring a group folder that groups said core-contents and said related contents across said plurality of logical volumes or said plurality of folders.

6. The management method of a storage system according to claim 5, wherein at said group folder creation step, a virtual folder for performing grouping is created; and wherein said core-contents and said related contents arranged in said virtual folder are associated with a plurality of contents to be stored in said plurality of folders created with said folder configuration unit, or said plurality of logical volumes.

7. The management method of a storage system according to claim 5, wherein at said related contents management step, when the management information managing the association of said core-contents and said related contents is changed, the association of said related contents stored in said group folder is changed.

8. The management method of a storage system according to claim 5, wherein said plurality of contents are a plurality of files; and wherein at said core-contents management step, a core file is specified and managed by said core file being searched based on the contents information sent from said host system.

* * * * *